US012755384B2

United States Patent

(12) United States Patent
Arcadu et al.

(10) Patent No.: US 12,755,384 B2
(45) Date of Patent: Oct. 6, 2026

(54) METHOD FOR ANALYZING DIGITAL IMAGES

(71) Applicant: Hoffmann-La Roche Inc., Little Falls, NJ (US)

(72) Inventors: Filippo Arcadu, Basel (CH); Maria Cristina De Vera Mudry, Basel (CH); Citlalli Gámez Serna, Basel (CH); Marco Tecilla, Basel (CH)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 156 days.

(21) Appl. No.: 18/578,723

(22) PCT Filed: Jul. 14, 2022

(86) PCT No.: PCT/EP2022/069710

§ 371 (c)(1),
(2) Date: Jan. 12, 2024

(87) PCT Pub. No.: WO2023/285584

PCT Pub. Date: Jan. 19, 2023

(65) Prior Publication Data

US 2024/0338826 A1 Oct. 10, 2024

(30) Foreign Application Priority Data

Jul. 15, 2021 (EP) .................................... 21185844

(51) Int. Cl.
*G06T 7/00* (2017.01)
*G06V 10/26* (2022.01)
*G06V 10/82* (2022.01)

(52) U.S. Cl.
CPC .......... *G06T 7/0014* (2013.01); *G06V 10/267* (2022.01); *G06V 10/82* (2022.01);
(Continued)

(58) Field of Classification Search
CPC ..................... G06T 7/0014; G06T 7/10; G06T 2207/20081; G06T 2207/20084;
(Continued)

(56) References Cited

U.S. PATENT DOCUMENTS 12,118,715 B2 * 10/2024 Courtiol ................. G06V 10/82
2021/0020304 A1 * 1/2021 Bakhshinejad ....... G06T 7/0016
(Continued)

FOREIGN PATENT DOCUMENTS

WO 2019088121 A1 5/2019
WO 2021126370 A1 6/2021

OTHER PUBLICATIONS

International Search Report and Written Opinion mailed on Oct. 7, 2022, received for PCT Application PCT/EP2022/069710, filed on Jul. 14, 2022, 9 pages.
(Continued)

*Primary Examiner* — John B Strege
(74) *Attorney, Agent, or Firm* — XSENSUS LLP

(57) ABSTRACT

Systems and methods disclosed herein relate generally to systems and methods for detection, segmentation and characterization of isolated or overlapping object instances in digital images, applicable for detection, segmentation and characterization of crypts in histological images from patients with gastrointestinal disorders.

17 Claims, 11 Drawing Sheets

(52) U.S. Cl.
CPC ............... *G06T 2207/20081* (2013.01); *G06T 2207/20084* (2013.01); *G06T 2207/30024* (2013.01); *G06T 2207/30092* (2013.01)

(58) Field of Classification Search
CPC ........... G06T 2207/30024; G06T 2207/30092; G06V 10/267; G06V 10/82; G06V 10/26; G06V 20/695; G06V 20/698; G06F 18/2414
See application file for complete search history.

(56) References Cited

U.S. PATENT DOCUMENTS

| | | | | |
|---|---|---|---|---|
| 2021/0065360 | A1* | 3/2021 | Laaksonen | G06T 7/12 |
| 2021/0133958 | A1* | 5/2021 | Chen | G06V 20/698 |
| 2021/0248747 | A1* | 8/2021 | Tang | G16H 50/20 |

OTHER PUBLICATIONS

Li et al., “Path R-CNN for Prostate Cancer Diagnosis and Gleason Grading of Histological Images”, IEEE Transactions on Medical Imaging, vol. 38, No. 4, Apr. 2019, pp. 945-954.

Yi et al., “Object-Guided Instance Segmentation With Auxiliary Feature Refinement for Biological Images”, arXiv:2106.07159v1, Jun. 14, 2021, pp. 1-12.

Chen et al., “Celltrack R-CNN: A Novel End-To-End Deep Neural Network For Cell Segmentation And Tracking In Microscopy Images”, 2021 IEEE 18th International Symposium on Biomedical Imaging (ISBI), Apr. 13-16, 2021, pp. 779-782.

Notice of Reasons for Rejection mailed Jun. 2, 2026, in Japanese Application No. 2024-500663, 14 pages including English translation.

Dangfu Yang et al., “A Mask R-CNN based particle identification for quantitative shape evaluation of granular materials”, Power Technology, ELSEVIER, vol. 392, pages from 296-305, available online Jul. 13, 2021, total 11 pages.

Muki Furuzuki et al., “A Detection Method for Liver Cancer Region Based on Faster R-CNN”, The 38th Annual Conference of the Japan Society of Medical Imaging Engineering, published in 2019, pp. 638-644, including English abstract, total 8 pages.

Communication pursuant to Article 94(3) EPC mailed Aug. 5, 2025, in European Application No. 22751677.0, 7 pages.

Kurnianingsih et al., “Segmentation and Classification of Cervical Cells Using Deep Learning”, IEEE Access, vol. 7, pp. 116925-116941, date of publication Aug. 19, 2019, XP011742835, total 17 pages.

Office Action mailed Jun. 21, 2026, in Korean Application No. 10-2024-7005057, total 6 pages including English translation.

* cited by examiner

METHOD FOR ANALYZING DIGITAL IMAGES

CROSS-REFERENCE TO RELATED APPLICATION

The present application is based on PCT filing PCT/EP2022/069710, filed Jul. 14, 2022, which claims priority from European Patent Application No. 21185844.4, filed Jul. 15, 2021, the entire contents of each are incorporated herein by reference.

The present invention relates to object detection, segmentation and characterization in digital images. Various embodiments of the present invention relate to systems and methods for object detection, segmentation and characterization in imaging data from clinical biopsies and, more specifically but not limited, to systems and methods for detection, segmentation and characterization of isolated and overlapping crypts to assess disease severity in Inflammatory Bowel Disease (IBD).

Digital image processing is the processing of digital images through computer algorithms, and has a wide range of applications, including industrial, environmental and medical imaging. Digital image processing is a rapidly advancing field, due to the improvements in hardware resources and software developments. Cloud computing in particular has increased the availability of data storage and computing power, and has revolutionized standard computer network systems. The availability of rapidly growing datasets of digital images has paved the way for the implementation of Machine Learning (ML) algorithms for image processing. ML algorithms enable a computer to learn a deterministic function that maps a set of input values to one or more output features, with the result of boosting the reachable capabilities in a variety of tasks, like enhancing details, increasing image quality, or applying filters. The most successful image processing techniques are represented by Deep Learning (DL) architectures, which are a subset of ML algorithms that from the dataset are able to learn functions represented as Deep Neural Networks (DNNs).

Digital pathology, along with other medical imaging modalities, like for example radiography, magnetic resonance imaging, tomography and others, has profited from the progress in digital image processing. Digital pathology, powered by the technique of Whole-Slide Imaging (WSI), consists in analyzing digitized images of tissue sections, stained with haematoxylin and eosin (H&E) or other stains on glass slides in order to visualize histopathological changes and formulate diagnoses. Computational pathology encompasses the step of analyzing the digitized histopathology images, typically by the application of Machine Learning (ML) algorithms. The use of ML models is enabling efficient assistance in histological diagnosis and prognosis, e.g. disease progression or response to a treatment, by providing a precise and automated segmentation of cells, cell nuclei, or more complex structures such as glands. Such models are typically trained on large datasets of manually annotated histological images. To achieve an accurate and fast segmentation, state-of-the-art Deep Learning (DL) models use a combination of different processing units to maximize the information, especially at the object boundaries, in order to detect objects of various sizes and shapes, and to enable the segmentation of multiple objects as well as the estimation of uncertainty on the segmentation. While known models are successful in segmenting neoplastic glands very close together in colonic adenocarcinoma ("MILD-Net:

Minimal information loss dilated network for gland instance segmentation in colon histology images", Graham. S. et al, Medical Image Analysis, Vol. 52, pp. 199-211 (2019); "Glandular Morphometrics for Objective Grading of Colorectal Adenocarcinoma Histology Images", Awan R. et al, Scientific Reports 7, Art. Nr. 16852 (2017), they fail in segmenting individual glands when glands are physically touching or overlapping, also referred to as macro-glands. Moreover, histological features of the glands are largely unexploited by the widely used histological grading systems used to capture the complexity of inflammation, progression, and response to treatment in IBD, such as the Geboes score ("Histopathology of Crohn's disease and ulcerative colitis", Geboes K., Inflammatory bowel disease 4 (2003): 210-28) and the Nancy Histological Index (NHI). In addition to inflammation, IBD and other gastrointestinal disorders are characterized by changes such as distortion of the mucosal architecture, decreased crypt density, crypt drop-out, crypt branching, and others. Therefore it is deemed extremely important to overcome the limitations of the known DL models and grading systems. Thus there is a need for improved systems and methods for object detection, segmentation and characterization in digital images, in particular systems and methods applicable for detection, segmentation and characterization of isolated and overlapping glands in digitized histopathology images to assess the severity of gastrointestinal inflammatory diseases. Further limitations and disadvantages of known models will become apparent to the skilled in the art, through comparison of the features of the prior art with some aspects of the present invention, as set forth in the remainder of the present invention and with reference to the drawings.

DETAILED DESCRIPTION

Figure 1:
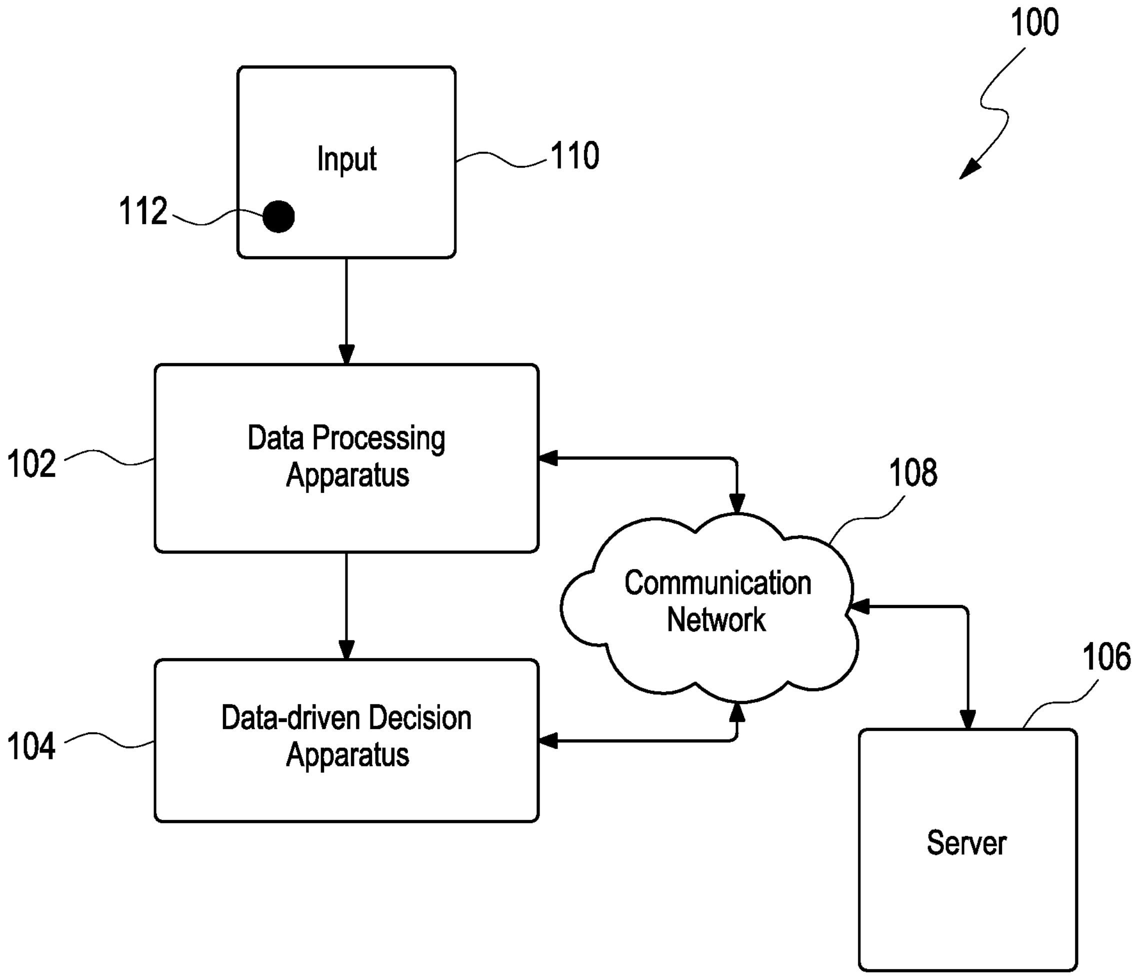
FIG. 1 illustrates an exemplary instance of a system for object detection, segmentation and characterization in an image using at least one trained deep neural network, in accordance with an embodiment of the invention.

The present invention relates to object detection, segmentation and characterization in digital images. Various embodiments of the present invention relate to systems and methods for object detection, segmentation and characterization in imaging data from clinical biopsies and, more specifically but not limited, to systems and methods for detection, segmentation and characterization of isolated and overlapping crypts to assess the level of inflammation in Inflammatory Bowel Disease (IBD).

The following described implementations refer to aspects of the disclosed systems and methods employed to detect and segment one or more isolated or overlapping objects of interest in an image by application of one or more trained Artificial Neural Networks (ANNs) or supervised Neural Networks, whereby the networks are trained on images containing one or more objects of interest with accompanying labelling metadata. When applied to imaging data from clinical biopsies, these networks are trained on histological images manually pre-annotated by pathologists. It can be evident to the person skilled in the art that the disclosed systems and methods can be adapted to the implementation of unsupervised Neural Networks, thus avoiding the need for performing pre-annotation of the large training dataset of images. The disclosed systems and methods can be further designed to characterize the objects of interest, by extracting their features and through them assess the temporal evolution of biomarkers. When applied to imaging data from clinical biopsies, the glands features extracted, such as but not limited to size, shape and distribution, can show insights into the temporal evolution of biomarkers, improving the clinical assessments of diseases such as colorectal adenocarcinoma, ischemic colitis, persistent infectious colitis, or IBD, which includes ulcerative colitis and Crohn's disease.

In some of the embodiments of the present invention, Deep Neural Networks (DNNs) can be employed. DNNs are networks comprising an input layer, one or more hidden layers and an output layer. DNNs have the ability to learn useful features from low-level raw data, and they outperform other Machine Learning (ML) approaches when trained on large datasets.

Among the existing DNNs, Convolutional Neural Networks (CNNs) are particularly suited for image recognition tasks. CNNs are built such that the processing units in the early layers learn to activate in response to simple local features, for example patterns at particular orientations or edges, while units in the deeper layers combine the low-level features into more complex patterns. Notably, Region based CNNs (R-CNNs) extract region proposals identifying where the object of interest can be located and then apply CNNs to classify the object and locate it within the region proposal by defining a bounding box around it. Improved versions of R-CNNs are Fast and Faster R-CNNs, which feed the input image to a CNN to create a feature map before extracting the region proposals, and differ between each other only in the applied region proposal search systems. In some of the embodiments according to the present invention, simple convolutional neural networks (CNN) can be employed for the whole workflow. In another embodiment, a Faster Region Based Convolutional Neural Network (Faster R-CNN) can be employed for the identification of a proposed Region of Interest (RoI) as well as for object detection. The R-CNN employed is no cell-tracker R-CC designated to detect cells and tracking them in a Cartesian plane.

Recent advancements in object segmentation techniques have led to the development of Instance Segmentation Models (ISMs), that allow to detect and classify single instances of objects in an image. ISMs contain two major parts: object detection, which includes classification and bounding box prediction, and object segmentation, which creates a pixel-wise mask for each object in the image. ISMs, contrary to other models such as semantic segmentation models which associate every pixel to a class rather than an instance of a class, are particularly suited for the detection and segmentation of multiple instances. In an embodiment, a Faster Region Based Convolutional Neural Network (Faster R-CNN) can be employed for the identification of a proposed Region of Interest (RoI) as well as for object detection, while a mask CNN comprising two CNNs can be employed for the object segmentation to output a binary mask.

Mask R-CNN is a R-CNN based technique employed in ISMs. Mask R-CNNs extend Faster R-CNNs by adding a branch for predicting an object mask in parallel with the branch for object detection. By decoupling the object detection, which comprises classification and bounding box prediction, from the object segmentation, which comprises mask prediction, Mask R-CNNs techniques are especially performant in detecting and segmenting overlapping instances. In an embodiment, a Mask R-CNN can replace the Faster R-CNN and mask CNN, with the capability of performing the object segmentation in parallel with the object detection, resulting in improved processing speed and improved accuracy especially in detecting overlapping objects.

As used in the present invention, the term input image refers to a digital image and/or a digitized version of an analog image.

Further, the term object of interest is defined as the clinically relevant artifact in the digital pathological images obtained through various means, including but not limited to manually-annotated Whole Slide Images (WSI). In particular, these clinically relevant artifacts are the histologically relevant artifacts like glands, crypts or nuclei, interchangeably replaceable with the generic terms lesions or structures or objects.

Further, it shall be noted that the term isolated refers to objects in digital images separated from other objects by at least one pixel from all of their perimetrical pixels. Contrarily, the term overlapping refers to objects in digital images not separated from other objects by any pixel from at least one of their perimetrical pixels, thus it comprises the case of objects with juxtaposed areas. The term macro associated to the term glands or any of its equivalents in this invention refers to the region covered by overlapping glands.

Further, it shall be noted that the terms classification, detection and segmentation in the present invention have the following specific technical meanings. Classification refers to establishing whether or not an object belongs to a certain class, like for example flowers, people, cars, crypts, or any other classes. Detection refers to locating the object position in an image, for example by predicting a bounding box around it. In the present invention, bounding box prediction techniques comprise but are not limited to bounding box regression, non-max suppression, Single Shot Detector (SSD). Segmentation refers to a classification performed at the pixel level, in contrast to the classification performed at the object level as defined above. Segmentation consists in classifying each pixel of an image according to whether or not a pixel belongs to a certain class of objects. Segmentation is typically carried out with the use of a mask, which can be a binary filter applied to an image to classify its pixels among those belonging to an object of interest, also referred to as signal, and those not belonging to an object of interest, also referred to as background.

According to some embodiments of the present invention, the term detection can comprise the object classification as well as the object detection as defined herein.

The invention will be more fully understood by reference to the examples described herein. The claims should not, however, be construed as limited to the scope of the examples.

FIG. 1 illustrates an exemplary instance of a system for object detection, segmentation and characterization in an image using at least one deep neural network, in accordance with an embodiment of the present invention. With reference to FIG. 1, the system 100 can include a data processing apparatus 102, a data-driven decision apparatus 104, a server 106 and a communication network 108. The data processing apparatus 102 can be communicatively coupled to the server 106 and the data-driven decision apparatus 104 via the communication network 108. In other embodiments, the data processing apparatus 102 and the data-driven decision apparatus 104 can be embedded in a single apparatus. The data processing apparatus 102 can receive as input an image 110 containing at least one object of interest 112. In other embodiments, the image 110 can be stored in the server 106 and sent from the server 106 to the data processing apparatus 102 via the communication network 108.

The data processing device 102 can be designed to receive the input image 110 and sequentially perform detection and segmentation of the at least one object of interest 112 in the input image 110 via at least one trained Deep Neural Network (DNN). In another embodiment, the data processing device 102 can be configured to perform in parallel the detection and the segmentation of the at least one object of interest 112 in the input image 110 via a single trained Deep Neural Network (DNN). The data processing device 102 can enable detection and segmentation of more than one isolated as well as overlapping objects of interest in the input image 110. The data processing device 102 can allow for the extraction of features, including but not limited to, shape, size, distribution, of the objects of interest. Examples of the data processing device 102 include but are not limited to a computer workstation, a handheld computer, a mobile phone, a smart appliance.

The data-driven decision apparatus 104 can comprise software, hardware or various combinations of these. The data-driven decision apparatus 104 can be designed to receive as input objects and features outputted by the data processing device 102 and, for example in clinical histological digital images, to assess the status of biomarkers based on said features of detected and segmented crypts. In an embodiment, the data-driven decision apparatus 104 can be able to access from the server 106 the stored features of one object, extracted while processing different images comprising the object, whereby these different images can have been recorded and annotated at different points in time. Thus in said embodiment the data-driven decision apparatus 104 can allow for an assessment of the temporal evolution of the object features. In the case of clinical histological digital images, the assessment of the temporal evolution of the object features can translate into an assessment of the temporal evolution of biomarkers. Examples of the data-driven decision apparatus 104 include but are not limited to computer workstation, a handheld computer, a mobile phone, a smart appliance.

The server 106 can be configured to store the training imaging datasets for the at least one trained DNN implemented in the data processing device 102. In some embodiments, the server 106 can also store metadata related to the training data. The server 106 can also store the input image 110 as well as some metadata related to the input image 110. The server 106 can be designed to send the input image 110 to the data processing apparatus 102 via the communication network 108, and/or to receive the output objects and features of the input image 110 from the data processing apparatus 102 via the communication network 108. The server 106 can also be configured to receive and store the score associated with the object features from the data-driven decision apparatus 104 via the communication network 108. Examples of the server 106 include but are not limited to application servers, cloud servers, database servers, file servers, and/or other types of servers.

The communication network 108 can comprise the means through which the data processing apparatus 102, the data-driven decision apparatus 104 and the server can be communicatively coupled. Examples of the communication network 108 include but are not limited to the Internet, a cloud network, a Wi-Fi network, a Personal Area Network (PAN), a Local Area Network (LAN) or a Metropolitan Area Network (MAN). Various devices of the system 100 can be configured to connect with the communication network 108 with wired and/or wireless protocols. Examples of protocols include but are not limited to Transmission Control Protocol/Internet Protocol (TCP/IP), Hypertext Transfer Protocol (HTTP), File Transfer Protocol (FTP), Bluetooth (BT).

The at least one trained DNN can be deployed on the data processing apparatus 102 and can be configured to output classes, bounding boxes and masks for each object, as well as extracted features of the said objects from the input image fed to the trained DNN. The at least one trained DNN can include a plurality of interconnected processing units, also referred to as neurons, arranged in at least one hidden layer plus an input layer and an output layer. Each neuron can be connected to other neurons, with connections modulated by weights.

Prior to deployment on the data processing apparatus 102, the at least one trained DNN can be obtained through a training process on a DNN architecture initialized with random weights. The training dataset can include pairs of images and their metadata, e.g. pre-annotated images in the case of clinical histological digital images. The metadata can comprise the number and position of objects in the images, as well as a shallow or detailed object classification. In an embodiment, the annotation can be performed manually by pathologists. In another embodiment, the training process is performed on a DNN architecture with a training dataset of unlabelled images. Unlabelled images can be images without any associated metadata. The DNN architecture can learn the output features of said unlabelled images via an unsupervised learning process. In an exemplary embodiment, the training dataset can be stored in the server 106 and/or the training process can be performed by the server 106.

In some embodiments, the trained DNN can be a trained Convolutional Neural Network (CNN). Processing units in the early layers of CNNs learn to activate in response to simple local features, for example patterns at particular orientations or edges, while units in the deeper layers combine the low-level features into more complex patterns. Region based CNNs (R-CNNs) extract region proposals where the object of interest can be located and then apply CNNs to classify the object and locate it within the region proposal by defining a bounding box around it.

In other embodiments, a Faster Region Based Convolutional Neural Network (Faster R-CNN) can be employed for the identification of a proposed Region of Interest (RoI) as well as for object detection, while a mask CNN comprising two CNNs can be employed for the object segmentation to output a binary mask. In another embodiment, a Mask R-CNN can replace the Faster R-CNN and mask CNN, with the capability of performing the object segmentation in parallel with the object detection, resulting in improved processing speed and improved accuracy especially in detecting overlapping objects. The process of image detection and segmentation in an embodiment designed with a Mask R-CNN architecture is described, for example, in FIG. 6.

The set of images and associated scores produced by the data-driven decision apparatus 104 can be deployed on the server 106 to be added to the training dataset for a further training process of the network. Images with scores as their associated metadata provided by the data-driven decision apparatus 104 can be used as an alternative training dataset for a supervised learning process. In some other embodiments, all functionalities of the data-driven decision apparatus 104 are implemented in the data processing apparatus 102.

Figure 2:
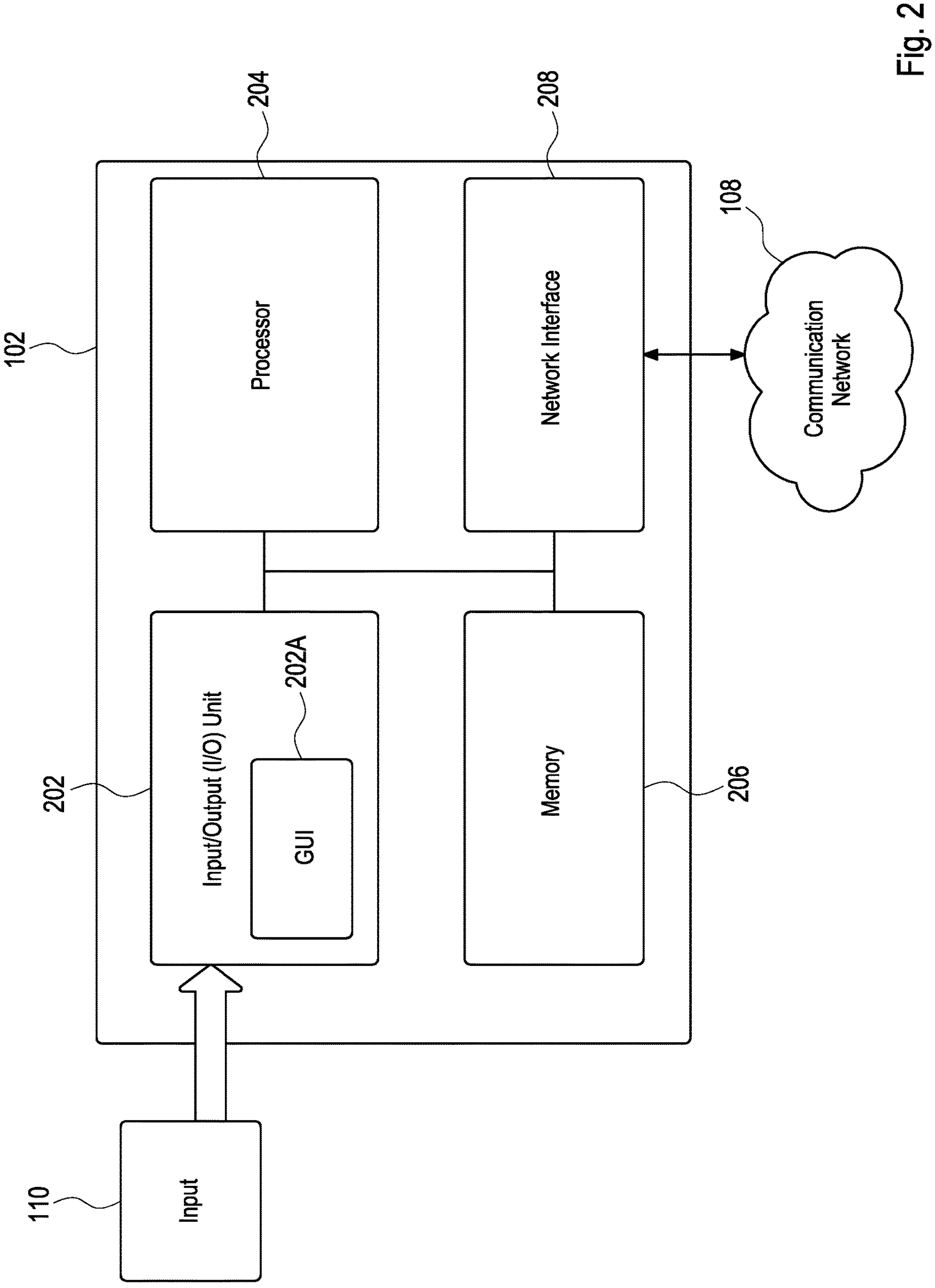
FIG. 2 depicts a block diagram that illustrates an exemplary data processing apparatus for object detection, segmentation and characterization using at least one deep neural network, in accordance with an embodiment of the invention.

FIG. 2 depicts a block diagram that illustrates an exemplary data processing apparatus for object detection, segmentation and characterization using at least one deep neural network, in accordance with an embodiment of the invention. FIG. 2 is explained in conjunction with elements from FIG. 1. With reference to FIG. 2, it is shown a block diagram 200 of the data processing apparatus 102. The data processing apparatus 102 can include an Input/Output (I/O) unit 202 further comprising a Graphical User Interface (GUI) 202A, a processor 204, a memory 206 and a network interface 208. The processor 204 can be communicatively coupled with the memory 206, the I/O unit 202, the network interface 208. In one or more embodiments, the data processing apparatus 102 can also include provisions to correlate the results of the data processing with one or more scoring systems.

The I/O unit 202 can comprise suitable logic, circuitry and interfaces that can act as interface between a user and the data processing apparatus 102. The I/O unit 202 can be configured to receive an input image 110 containing at least one object of interest 112. The I/O unit 202 can include different operational components of the data processing apparatus 102. The I/O unit 202 can be programmed to provide a GUI 202A for user interface. Examples of the I/O unit 202 can include, but are not limited to, a touch screen, a keyboard, a mouse, a joystick, a microphone, and a display screen, like for example a screen displaying the GUI 202A.

The GUI 202A can comprise suitable logic, circuitry and interfaces that can be configured to provide the communication between a user and the data processing apparatus 102. In some embodiments, the GUI can be displayed on an external screen, communicatively or mechanically coupled to the data processing apparatus 102. The screen displaying the GUI 202A can be a touch screen or a normal screen.

The processor 204 can comprise suitable logic, circuitry and interfaces that can be configured to execute programs stored in the memory 206. The programs can correspond to sets of instructions for image processing operations, including but not limited to object detection and segmentation. In some embodiments, the sets of instructions also include the object characterization operation, including but not limited to feature extraction. The processor 204 can be built on a number of processor technologies known in the art. Examples of the processor 204 can include, but are not limited to, Graphical Processing Units (GPUs), a Central Processing Units (CPUs), motherboards, network cards.

The memory 206 can comprise suitable logic, circuitry and interfaces that can be configured to store programs to be executed by the processor 204. Additionally, the memory 206 can be configured to store the input image 110 and/or its associated metadata. In another embodiment, the memory can store a subset of or the entire training dataset, comprising in some embodiments the pair of images and their associated metadata. Examples of the implementation of the memory 206 can include, but are not limited to, Random Access Memory (RAM), Read Only Memory (ROM), Hard Disk Drive (HDD), Solid State Drive (SDD) and/or other memory systems.

The network interface 208 can comprise suitable logic, circuitry and interfaces that can be configured to enable the communication between the data processing apparatus 102, the data-driven decision apparatus 104 and the server 106 via the communication network 108. The network interface 208 can be implemented in a number of known technologies that support wired or wireless communication with the communication network 108. The network interface 208 can include, but is not limited to, a computer port, a network interface controller, a network socket or any other network interface systems.

Figure 3:
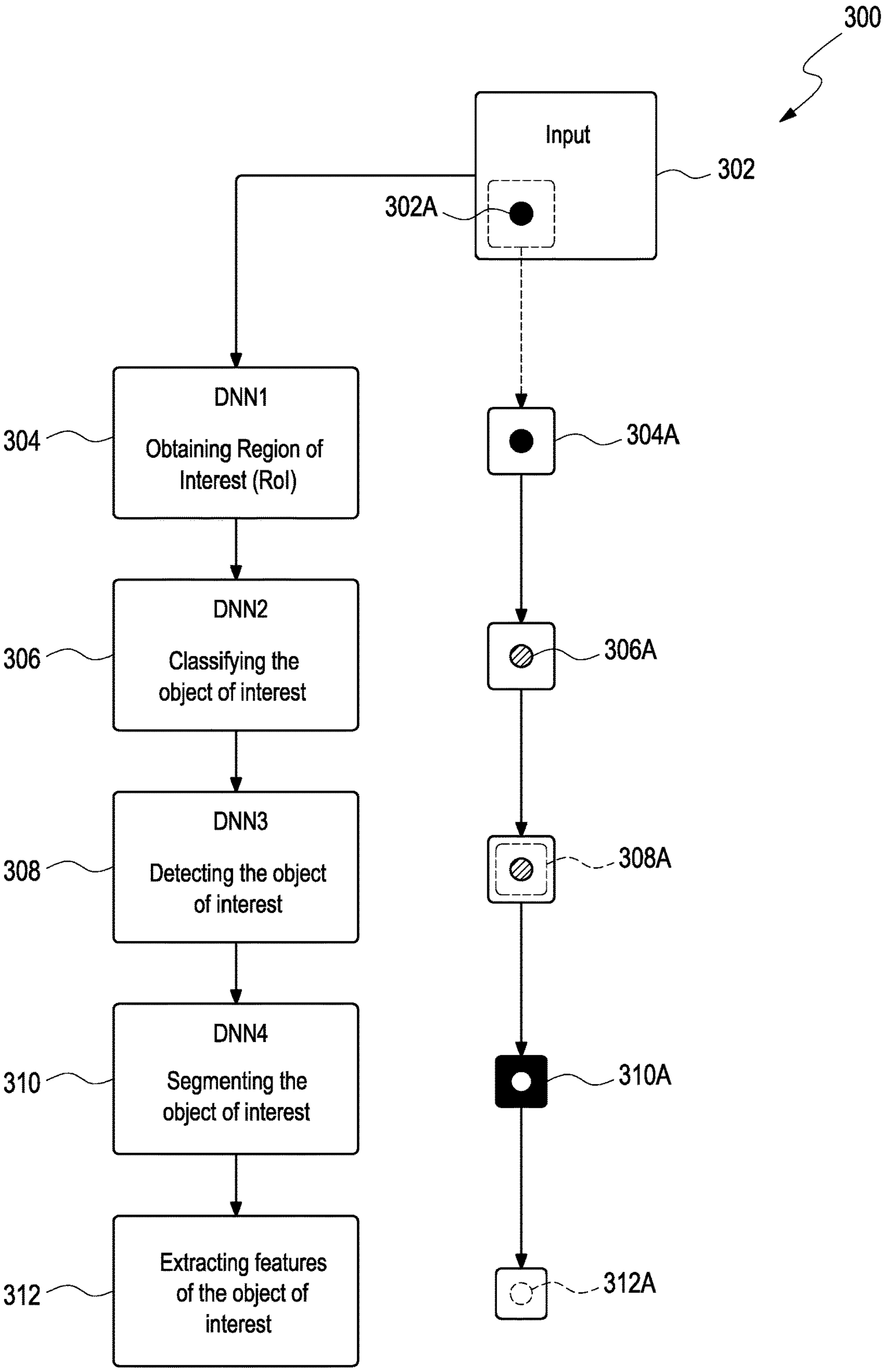
FIG. 3 illustrates an exemplary workflow for the operation of a system for object detection, segmentation and characterization in an image using for example four trained deep neural networks: one for obtaining at least one Region of Interest (RoI), one for object classification, one for object detection, and one for object segmentation, in accordance with an embodiment of the invention.

FIG. 3 illustrates an exemplary workflow for the operation of a system for object detection, segmentation and characterization in an image using for example four trained deep neural networks: one for obtaining at least one Region of Interest (RoI), one for object classification, one for object detection, and one for object segmentation, in accordance with an embodiment of the invention. With reference to FIG. 3, an exemplary workflow 300 is shown. Herein, the exemplary neural networks are named as DNNn, where n is a number employed to distinguish the several instances of neural networks within FIG. 3. It shall be noted that the numbering shall not be used to compare instances of neural networks among different figures.

The input image 302 can comprise at least one object of interest 302A. In some embodiments, the object of interest 302A can be formed by several isolated or overlapping objects.

At 304, a first deep neural network DNN1 can be executed. The trained DNN1 can be fed with the input image 302 to generate a region proposal 304A within the image where the at least one object of interest 302A can be located. The trained DNN1 can be able to generate several region proposals within the image, one for each object of interest, if several objects of interest, isolated or overlapping, are present in the input image. In some embodiments, the DNN1 architecture can implement algorithms like Region Proposal Networks (RPN), which can comprise a CNN for feature map extraction from the input image and then a small network to slide over the feature map and generate the Region of Interest (RoI). At 306, a second deep neural network DNN2 can be executed on the at least one Region of Interest (RoI) 304A defined at 304. The trained DNN2 can perform the classification of the one or more objects of interest in each Region of Interest (RoI), and can return a class 306A for the object of interest. In several embodiments, the trained DNN2 can comprise a chain of several trained DNNs to perform tasks sequentially or in parallel. At 308, a third deep neural network DNN3 can be executed on the at least one classified object 306A. The trained DNN3 can perform the detection of the one or more objects of interest classified at 306. In some of these embodiments, the trained DNN3 performing the object detection 308 can return a bounding box 308A around the at least one object of interest. In several embodiments, the trained DNN3 can comprise a chain of several trained DNNs to perform tasks sequentially or in parallel. In some embodiments, the DNN3 architecture can comprise but not be limited to Fast or Faster R-CNN.

At 310, a fourth deep neural network DNN4 can be executed on the at least one detected object within the bounding box 308A defined at 308. The trained DNN4 can perform the segmentation of the one or more objects of interest in each bounding box. In some embodiments, the DNN4 performing the object segmentation 310 can return a binary mask 310A through which each pixel in the bounding box 308A can be classified as belonging to the object of interest or the background. In some embodiments, the DNN4 can comprise a chain of several trained DNNs to perform tasks sequentially or in parallel. In some embodiments, the trained DNN4 can be a CNN or a chain of CNNs.

At 312, features 312A can be extracted from the one or more classified, detected and segmented object of interest. In some embodiments, features can comprise, but be not limited to, shape, size and distribution of the objects. In some embodiments, the feature extraction step 312 can comprise one DNN or a chain of DNNs to perform tasks sequentially or in parallel. In some embodiments, the DNN can be a CNN or a chain of CNNs.

Figure 4:
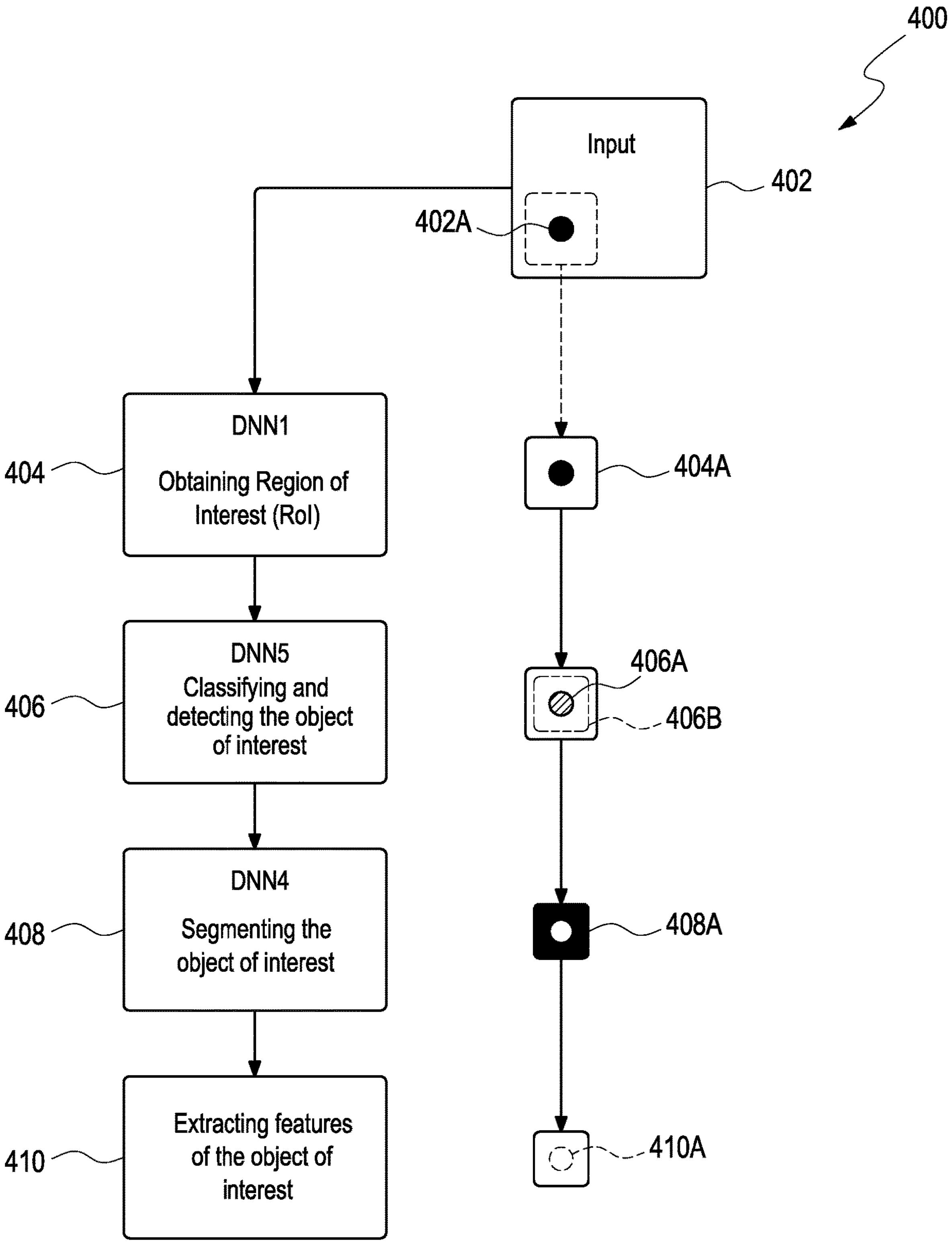
FIG. 4 illustrates an exemplary workflow for the operation of a system for object detection, segmentation and characterization in an image using for example three trained deep neural networks: one for obtaining at least one Region of Interest (RoI), one for object classification and object detection, and one for object segmentation, in accordance with an embodiment of the invention.

FIG. 4 illustrates an exemplary workflow for the operation of a system for object detection, segmentation and characterization in an image using for example three trained deep neural networks: one for obtaining at least one Region of Interest (RoI), one for object classification and object detection, and one for object segmentation, in accordance with an embodiment of the invention. With reference to FIG. 4, an exemplary workflow 400 is shown that develops on the workflow shown in FIG. 3. Herein, the exemplary neural networks are named as DNNn, where n is a number employed to distinguish the several instances of neural networks within FIG. 4. It shall be noted that the numbering shall not be used to compare instances of neural networks among different figures.

The input image 402 can comprise at least one object of interest 402A. In some embodiments, the object of interest 402A can be formed by several isolated or overlapping objects.

At 404, a first deep neural network DNN1 can be executed. The trained DNN1 can be fed with the input image 402 to generate a region proposal 404A within the image where the at least one object of interest 402A can be located. The trained DNN1 can be able to generate several region proposals within the image, one for each object of interest, if several objects of interest, isolated or overlapping, are present in the input image. In some embodiments, the DNN1 architecture can implement algorithms like Region Proposal Networks (RPN), which can comprise a CNN for feature map extraction from the input image and then a small network to slide over the feature map and generate the Region of Interest (RoI).

At 406, another deep neural network DNN5 can be executed on the at least one Region of Interest (RoI) 404A defined at 404. The trained DNN5 can perform the classification of the one or more objects of interest in each Region of Interest (RoI), and can return a class 406A for the object of interest. The trained DNN5 can perform the detection of the one or more classified objects of interest in each Region of Interest (RoI), and can return a bounding box 406B around the at least one object of interest. In several embodiments, the trained DNN5 can comprise a chain of several trained DNNs to perform tasks sequentially or in parallel. In some embodiments, the DNN5 architecture can comprise but not be limited to Fast or Faster R-CNN.

At 408, another deep neural network DNN4 can be executed on the at least one detected object within the bounding box 406B defined at 406. The trained DNN4 can perform the segmentation of the one or more objects of interest in each bounding box. In some embodiments, the DNN4 performing the object segmentation 408 can return a binary mask 408A through which each pixel in the bounding box 406B can be classified as belonging to the object of interest or the background. In some embodiments, the DNN4 can comprise a chain of several trained DNNs to perform tasks sequentially or in parallel. In some embodiments, the trained DNN4 can be a CNN or a chain of CNNs.

At 410, features 410A can be extracted from the one or more classified, detected and segmented object of interest. In some embodiments, features can comprise, but be not limited to, shape, size and distribution of the objects. In some embodiments, the feature extraction step 410 can comprise one DNN or a chain of DNNs to perform tasks sequentially or in parallel. In some embodiments, the DNN can be a CNN or a chain of CNNs.

Figure 5:
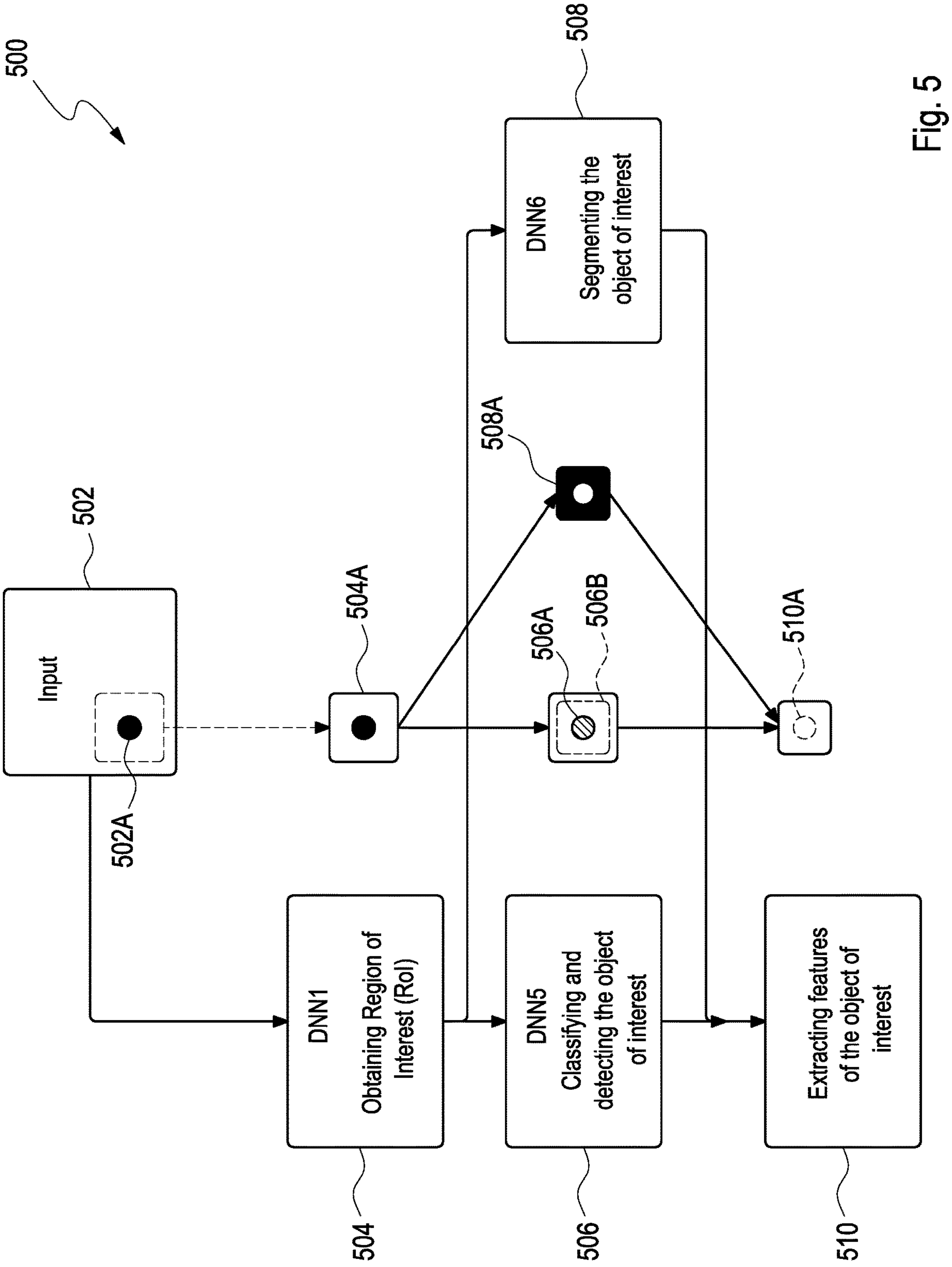
FIG. 5 illustrates an exemplary workflow for the operation of a system for object detection, segmentation and characterization in an image using for example three trained deep neural networks: one for obtaining at least one Region of Interest (RoI), one for object classification and object detection, and one for object segmentation, where the object classification and detection is performed in parallel to the object segmentation, in accordance with an embodiment of the invention.

FIG. 5 illustrates an exemplary workflow for the operation of a system for object detection, segmentation and characterization in an image using for example three trained deep neural networks: one for obtaining at least one Region of Interest (RoI), one for object classification and object detection, and one for object segmentation, where the object classification and detection is performed in parallel to the object segmentation, in accordance with an embodiment of the invention. With reference to FIG. 5, an exemplary workflow 500 is shown. Herein, the exemplary neural networks are named as DNNn, where n is a number employed to distinguish the several instances of neural networks within FIG. 5. It shall be noted that the numbering shall not be used to compare instances of neural networks among different figures.

The input image 502 can comprise at least one object of interest 502A. In some embodiments, the object of interest 502A can be formed by several isolated or overlapping objects.

At 504, a first deep neural network DNN1 can be executed. The trained DNN1 can be fed with the input image 502 to generate a region proposal 504A within the image where the at least one object of interest 502A can be located. The trained DNN1 can be able to generate several region proposals within the image, one for each object of interest, if several objects of interest, isolated or overlapping, are present in the input image. In some embodiments, the DNN1 architecture can implement algorithms like Region Proposal Networks (RPN), which can comprise a CNN for feature map extraction from the input image and then a small network to slide over the feature map and generate the Region of Interest (RoI).

At 506, another deep neural network DNN5 can be executed on the at least one Region of Interest (RoI) 504A defined at 504. The trained DNN5 can perform the classification of the one or more objects of interest in each Region of Interest (RoI), and can return a class 506A for the object of interest. The trained DNN5 can perform the detection of the one or more classified objects of interest in each Region of Interest (RoI), and can return a bounding box 506B around the at least one object of interest. In several embodiments, the trained DNN5 can comprise a chain of several trained DNNs to perform tasks sequentially or in parallel. In some embodiments, the DNN5 architecture can comprise but not be limited to Fast or Faster R-CNN.

At 508, another deep neural network DNN6 can be executed on the at least one detected object within the bounding box 506B defined at 506. The trained DNN6 can perform the segmentation of the one or more objects of interest in each Region of Interest (RoI). In some embodiments, the DNN6 performing the object segmentation 508 can return a binary mask 508A through which each pixel in the bounding box 506B can be classified as belonging to the object of interest or the background. In some embodiments, the DNN6 can comprise a chain of several trained DNNs to perform tasks sequentially or in parallel. In some embodiments, the trained DNN6 architecture can comprise a CNN, R-CNN or a chain of CNNs or R-CNNs.

At 510, features 510A can be extracted from the one or more classified, detected and segmented object of interest. In some embodiments, features can comprise, but be not limited to, shape, size and distribution of the objects. In some embodiments, the feature extraction step 510 can comprise one DNN or a chain of DNNs to perform tasks sequentially or in parallel. In some embodiments, the DNN can be a CNN or a chain of CNNs.

Figure 6:
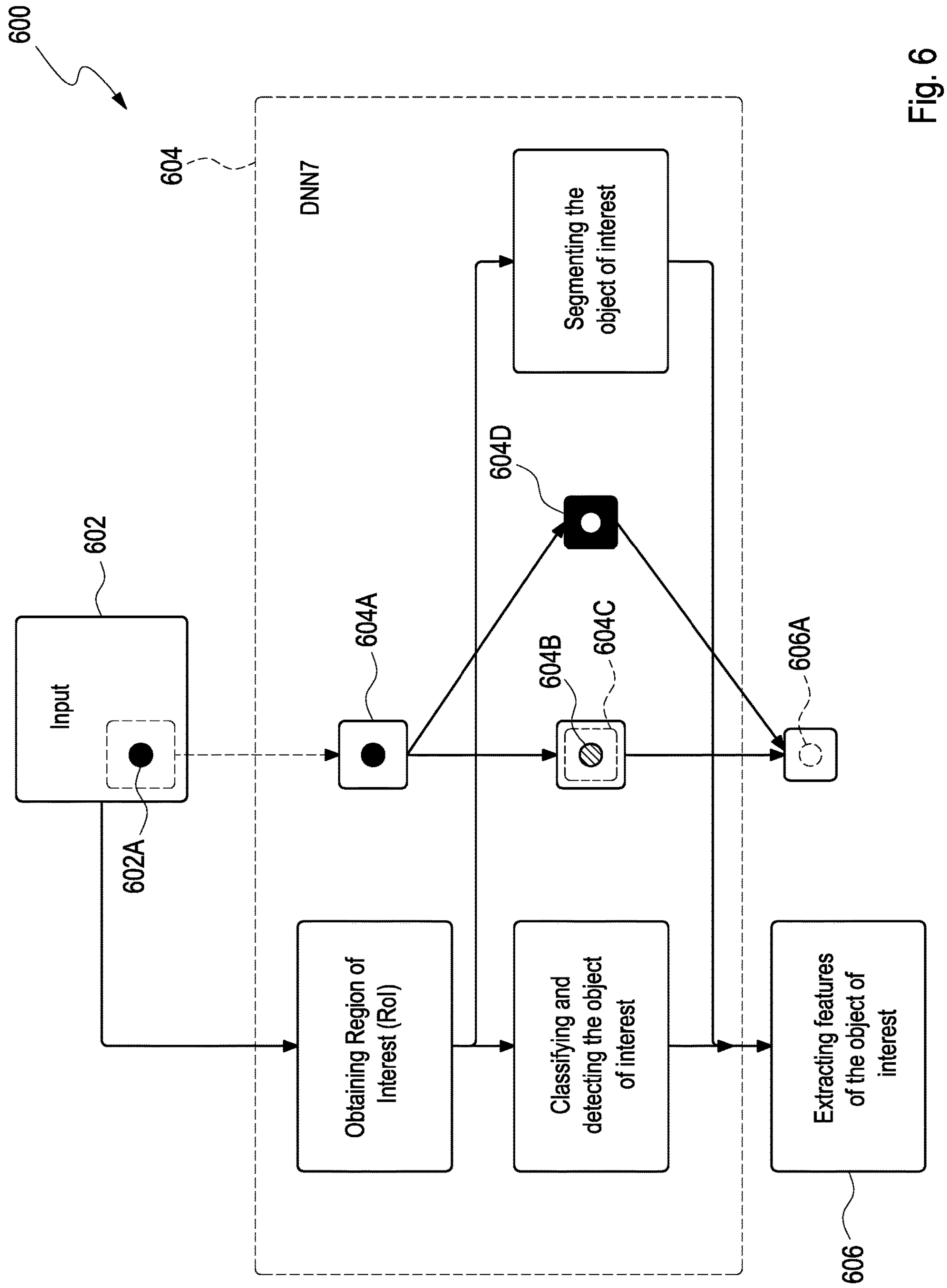
FIG. 6 illustrates an exemplary workflow for the operation of a system for object detection, segmentation and characterization in an image using for example one trained deep neural network for obtaining at least one Region of Interest (RoI), for object classification and object detection, and for object segmentation, where the object classification and detection is performed in parallel to the object segmentation, in accordance with an embodiment of the invention.

FIG. 6 illustrates an exemplary workflow for the operation of a system for object detection, segmentation and characterization in an image using for example one trained deep neural network for obtaining at least one Region of Interest (RoI), for object classification and object detection, and for object segmentation, where the object classification and detection is performed in parallel to the object segmentation, in accordance with an embodiment of the invention. With reference to FIG. 6, an exemplary workflow 600 is shown. Herein, the exemplary neural networks are named as DNNn, where n is a number employed to distinguish the several instances of neural networks within FIG. 6. It shall be noted that the numbering shall not be used to compare instances of neural networks among different figures.

The input image 602 can comprise at least one object of interest 602A. In some embodiments, the object of interest 602A can be formed by several isolated or overlapping objects.

At 604, a deep neural network DNN7 can be executed. The trained DNN7 can be able to generate a region proposal 604A within the image where the at least one object of interest 602A can be located. The trained DNN7 can be able to generate several region proposals within the image, one for each object of interest, if several objects of interest, isolated or overlapping, are present in the input image. In some embodiments, the DNN7 architecture can implement algorithms like Region Proposal Networks (RPN), which can comprise a CNN for feature map extraction from the input image and then a small network to slide over the feature map and generate the Region of Interest (RoI). Further, the trained DNN7 can perform the classification of the one or more objects of interest in each Region of Interest (RoI), and can return a class 604B for the object of interest. The trained DNN7 can perform the detection of the one or more classified objects of interest in each Region of Interest (RoI), and can return a bounding box 604C around the at least one object of interest. In several embodiments, the trained DNN7 can comprise a chain of several trained DNNs to perform tasks sequentially or in parallel. In some embodiments, the DNN5 architecture can comprise but not be limited to Fast or Faster R-CNN.

Further, the trained DNN7 can perform the segmentation of the one or more objects of interest in each Region of Interest (RoI). In some embodiments, the DNN7 performing the object segmentation can return a binary mask 604D through which each pixel in the bounding box 604C can be classified as belonging to the object of interest or the background. In some embodiments, the DNN7 can comprise a chain of several trained DNNs to perform tasks sequentially or in parallel. In some embodiments, the trained DNN7 architecture can comprise a CNN, R-CNN or a chain of CNNs or R-CNNs. In another embodiment, the trained DNN7 architecture can comprise Fast or Faster R-CNN and/or Mask R-CNN.

Figure 7:
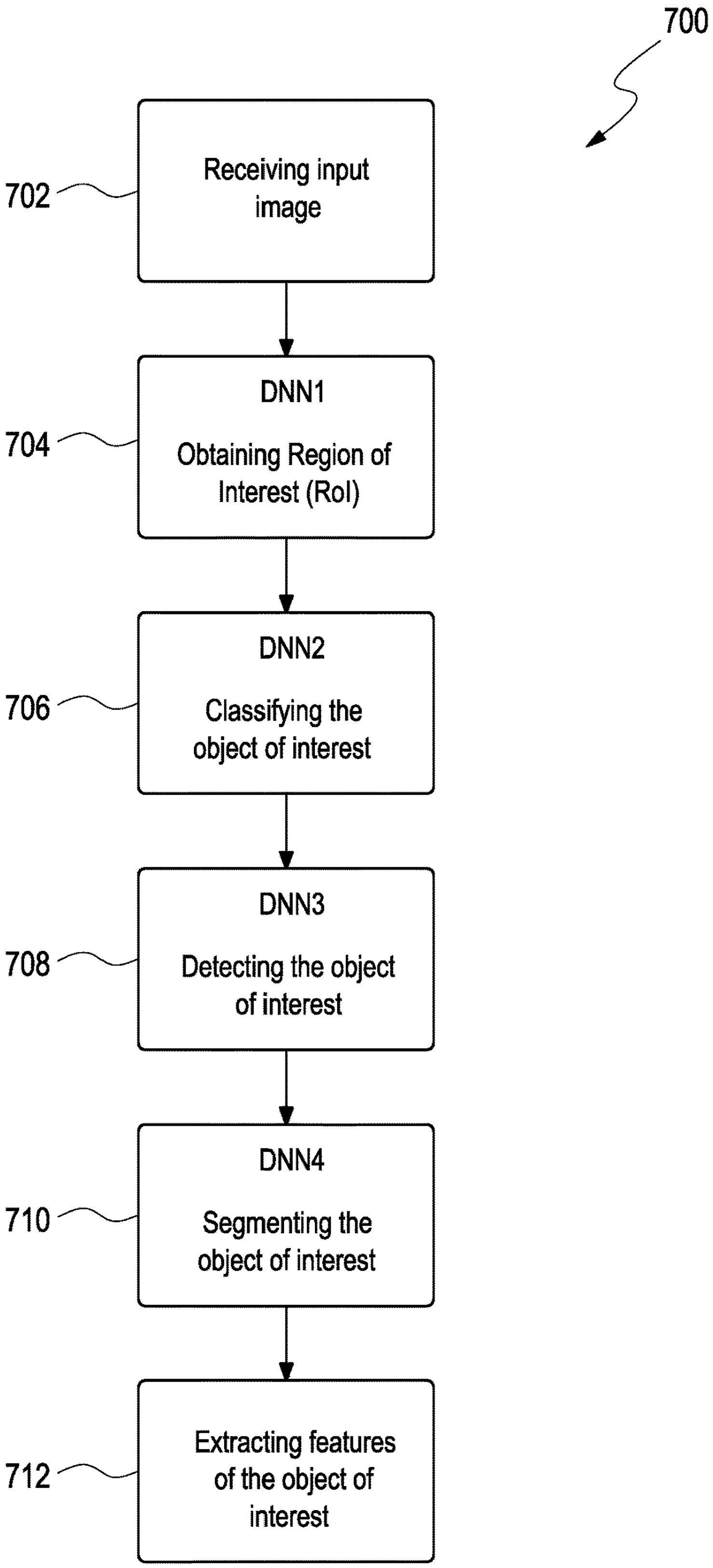
FIG. 7 depicts a flow chart that illustrates an exemplary method for object detection, segmentation and characterization in an image using for example four trained deep neural networks: one for obtaining at least one Region of Interest (RoI), one for object classification, one for object detection, and one for object segmentation, in accordance with an embodiment of the invention.

FIG. 7 depicts a flow chart that illustrates an exemplary method for object detection, segmentation and characterization in an image using for example four trained deep neural networks: one for obtaining at least one Region of Interest (RoI), one for object classification, one for object detection, and one for object segmentation, in accordance with an embodiment of the invention. With reference to FIG. 7, an exemplary flow chart 700 is shown. Herein, the exemplary neural networks are named as DNNn, where n is a number employed to distinguish the several instances of neural networks within FIG. 7. It shall be noted that the numbering shall not be used to compare instances of neural networks among different figures. The operations from 702 to 712, or subsets therein, can be implemented on any computing system, for example the data processing apparatus 102 and/or the data-driven decision apparatus 104.

At 702, an input image can be received. In some embodiment, the input image can be received from some database. The input image can comprise at least one object of interest.

At 704, at least one Region of Interest (RoI) can be obtained for the at least one object of interest via a trained deep neural network DNN1 on the input image.

At 706, the at least one object of interest can be classified via a trained deep neural network DNN2 on the at least one Region of Interest (RoI).

At 708, the at least one object of interest can be detected via a trained deep neural network DNN3 on the at least one classified object. The trained DNN3 can comprise the step of bounding box regression.

At 710, the at least one detected object of interest can be segmented via a trained deep neural network DNN4 on the at least one classified object. The trained DNN4 can generate a binary mask.

At 712, features can be extracted from the at least one segmented object of interest. In some embodiment, the feature extraction step can be performed via a trained DNN.

Figure 8:
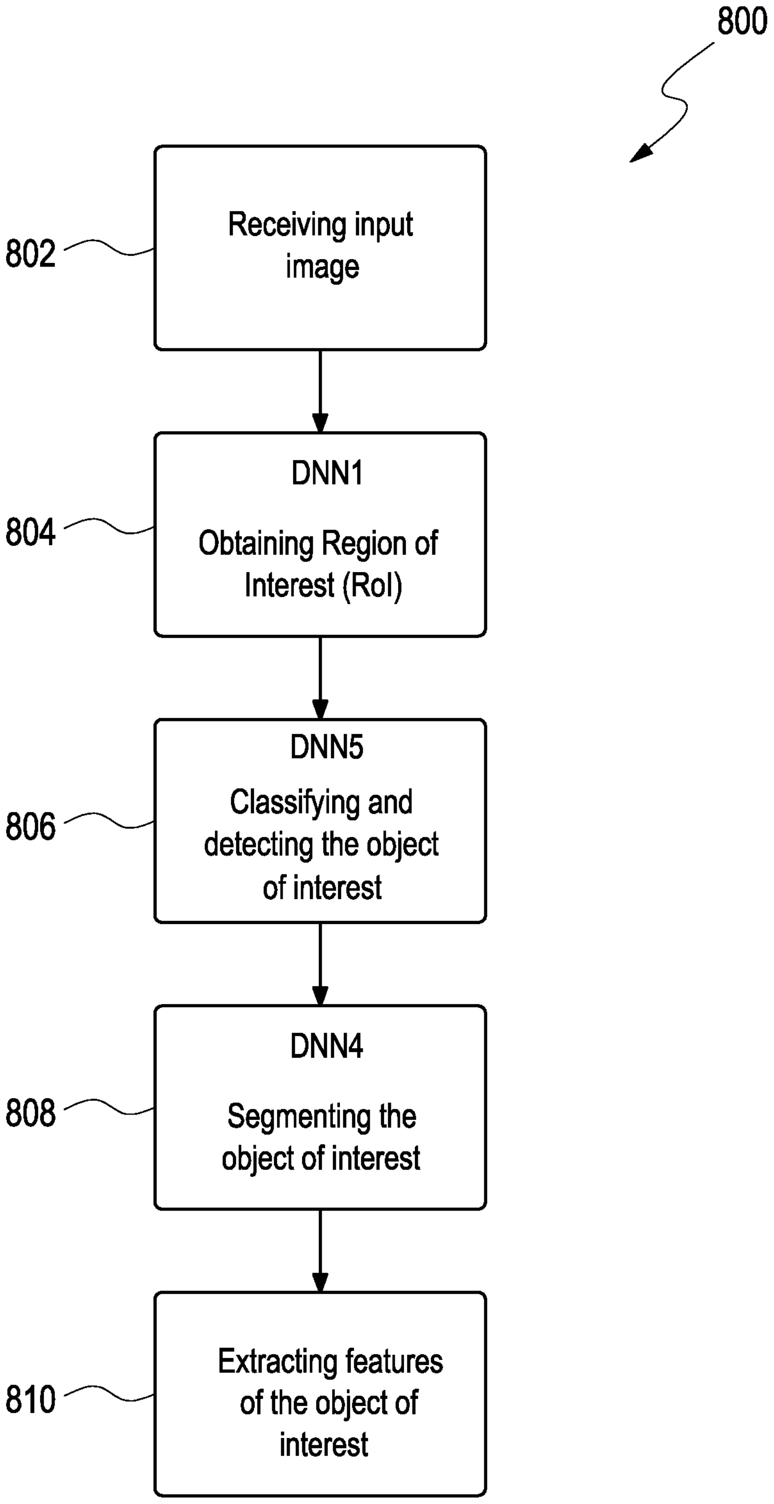
FIG. 8 depicts a flow chart that illustrates an exemplary method for object detection, segmentation and characterization in an image using for example three trained deep neural networks: one for obtaining at least one Region of Interest (RoI), one for object classification and object detection, and one for object segmentation, in accordance with an embodiment of the invention.

FIG. 8 depicts a flow chart that illustrates an exemplary method for object detection, segmentation and characterization in an image using for example three trained deep neural networks: one for obtaining at least one Region of Interest (RoI), one for object classification and object detection, and one for object segmentation, in accordance with an embodiment of the invention. With reference to FIG. 8, an exemplary flow chart 800 is shown. Herein, the exemplary neural networks are named as DNNn, where n is a number employed to distinguish the several instances of neural networks within FIG. 8. It shall be noted that the numbering shall not be used to compare instances of neural networks among different figures. The operations from 802 to 810, or subsets therein, can be implemented on any computing system, for example the data processing apparatus 102 and/or the data-driven decision apparatus 104.

At 802, an input image can be received. In some embodiment, the input image can be received from some database. The input image can comprise at least one object of interest.

At 804, at least one Region of Interest (RoI) can be obtained for the at least one object of interest via a trained deep neural network DNN1 on the input image.

At 806, the at least one object of interest can be classified and detected via a trained deep neural network DNN5 on the at least one Region of Interest (RoI). The trained DNN5 can comprise the step of bounding box regression.

At 808, the at least one detected object of interest can be segmented via a trained deep neural network DNN4 on the at least one classified object. The trained DNN4 can generate a binary mask.

At 810, features can be extracted from the at least one segmented object of interest. In some embodiments, the feature extraction step can be performed via a trained DNN.

Figure 9:
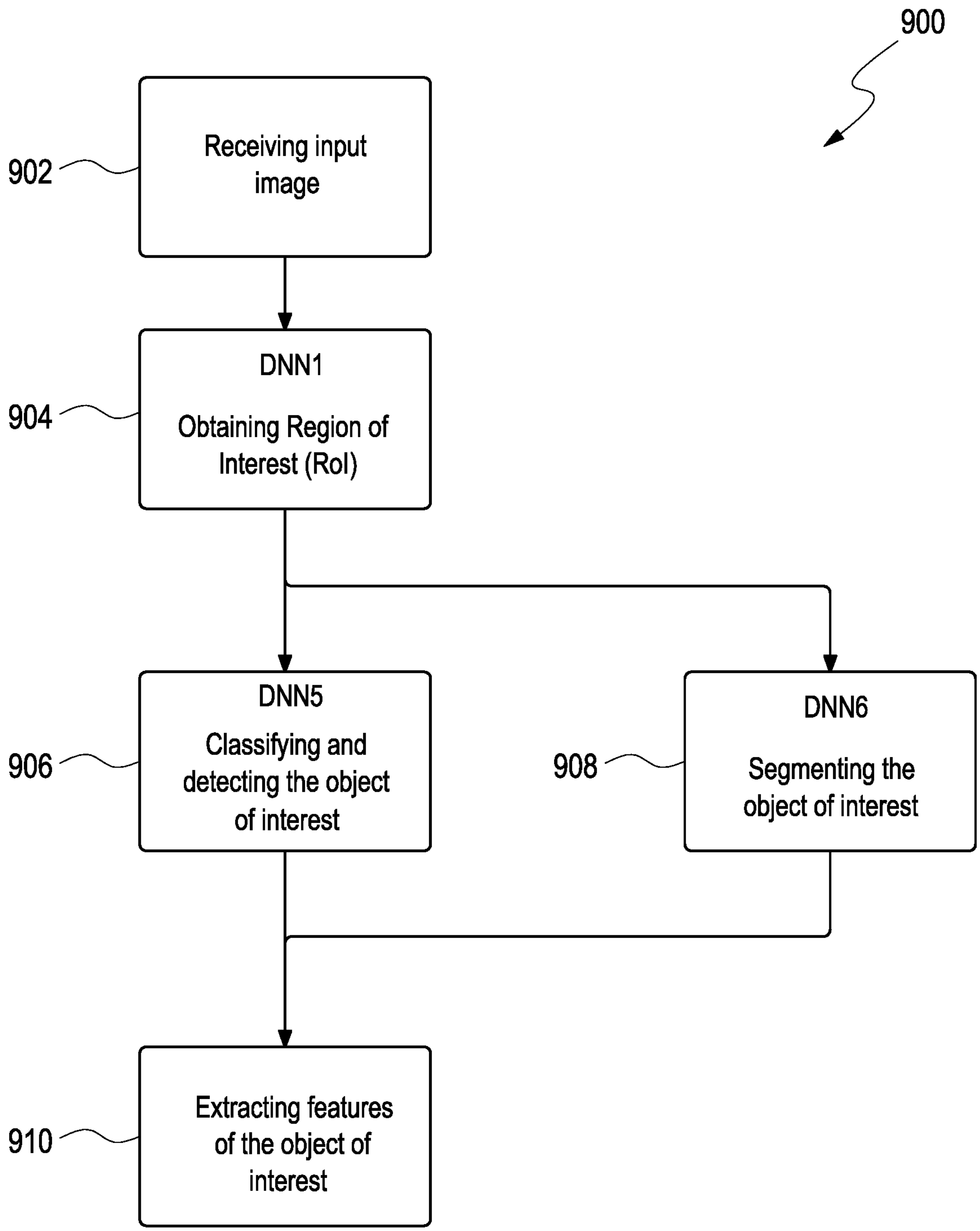
FIG. 9 depicts a flow chart that illustrates an exemplary method for object detection, segmentation and characterization in an image using for example three trained deep neural networks: one for obtaining at least one Region of Interest (RoI), one for object classification and object detection, and one for object segmentation, where the object classification and detection is performed in parallel to the object segmentation, in accordance with an embodiment of the invention.

FIG. 9 depicts a flow chart that illustrates an exemplary method for object detection, segmentation and characterization in an image using for example three trained deep neural networks: one for obtaining at least one Region of Interest (RoI), one for object classification and object detection, and one for object segmentation, where the object classification and detection is performed in parallel to the object segmentation, in accordance with an embodiment of the invention. With reference to FIG. 9, an exemplary flow chart 900 is shown. Herein, the exemplary neural networks are named as DNNn, where n is a number employed to distinguish the several instances of neural networks within FIG. 9. It shall be noted that the numbering shall not be used to compare instances of neural networks among different figures. The operations from 902 to 910, or subsets therein, can be implemented on any computing system, for example the data processing apparatus 102 and/or the data-driven decision apparatus 104.

At 902, an input image can be received. In some embodiments, the input image can be received from some database. The input image can comprise at least one object of interest.

At 904, at least one Region of Interest (RoI) can be obtained for the at least one object of interest via a trained deep neural network DNN1 on the input image.

At 906, the at least one object of interest can be classified and detected via a trained deep neural network DNN5 on the at least one Region of Interest (RoI). The trained DNN5 can comprise the step of bounding box regression.

At 908, the at least one object of interest can be segmented via a trained deep neural network DNN6 on the at least one Region of Interest (RoI). The trained DNN6 can generate a binary mask. In some embodiments, the trained DNN5 and DNN6 are executed in parallel on the at least one Region of Interest (RoI).

At 910, features can be extracted from the at least one detected and segmented object of interest. In some embodiments, the feature extraction step can be performed via a trained DNN.

Figure 10:
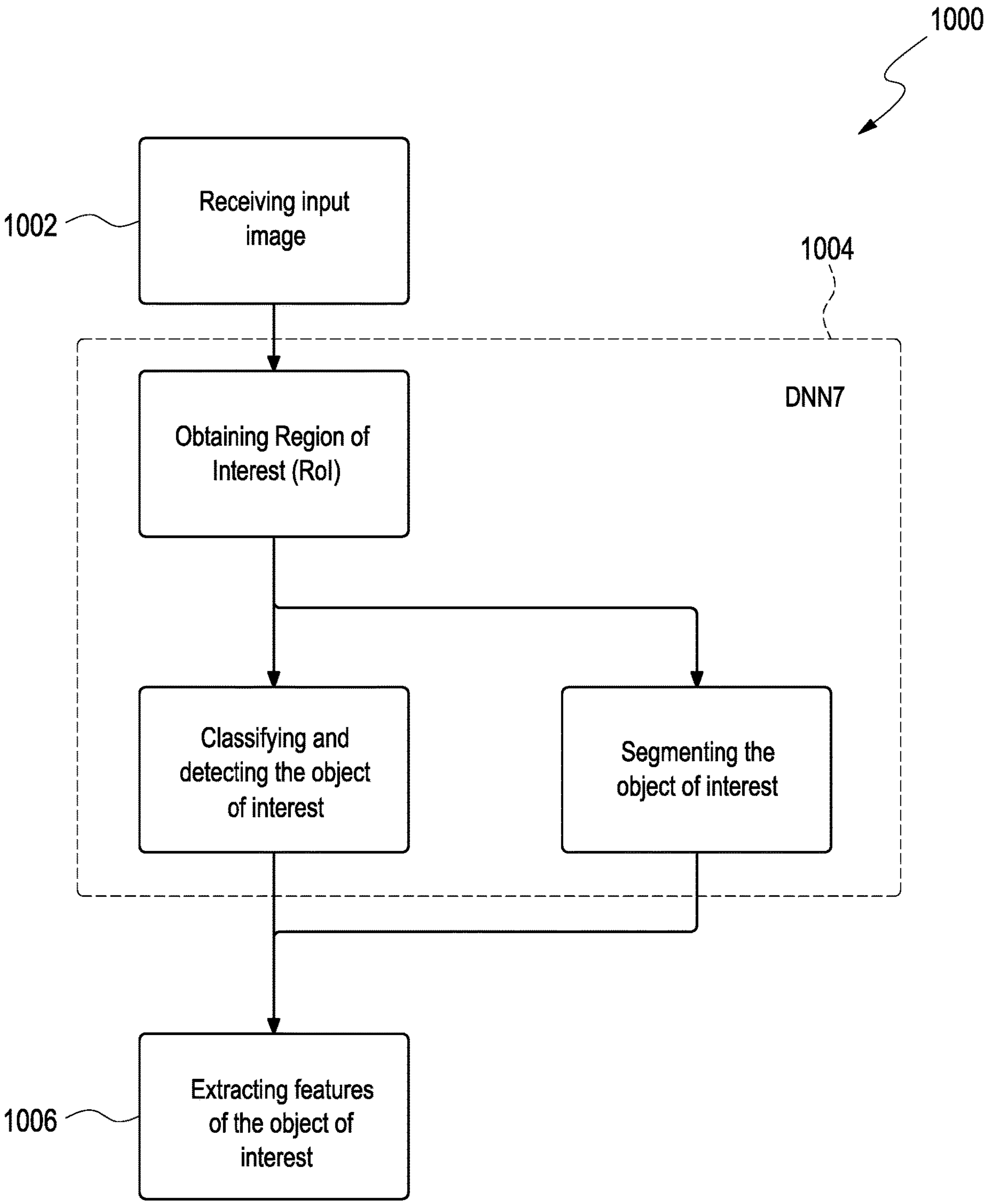
FIG. 10 depicts a flow chart that illustrates an exemplary method for object detection, segmentation and characterization in an image using for example one trained deep neural network for obtaining at least one Region of Interest (RoI), for object classification and object detection, and for object segmentation, where the object classification and detection is performed in parallel to the object segmentation, in accordance with an embodiment of the invention.

FIG. 10 depicts a flow chart that illustrates an exemplary method for object detection, segmentation and characterization in an image using for example one trained deep neural network for obtaining at least one Region of Interest (RoI), for object classification and object detection, and for object segmentation, where the object classification and detection is performed in parallel to the object segmentation, in accordance with an embodiment of the invention. With reference to FIG. 10, an exemplary flow chart 1000 is shown. Herein, the exemplary neural networks are named as DNNn, where n is a number employed to distinguish the several instances of neural networks within FIG. 10. It shall be noted that the numbering shall not be used to compare instances of neural networks among different figures. The operations from 1002 to 1006, or subsets therein, can be implemented on any computing system, for example the data processing apparatus 102 and/or the data-driven decision apparatus 104.

At 1002, an input image can be received. In some embodiments, the input image can be received from some database. The input image can comprise at least one object of interest.

At 1004, at least one Region of Interest (RoI) can be obtained for the at least one object of interest via a trained deep neural network DNN7 on the input image. Further, the at least one object of interest can be classified and detected in the at least one Region of Interest (RoI). The object detection can comprise the step of bounding box regression. Further, the at least one object of interest can be segmented in the at least one Region of Interest (RoI). The object segmentation can comprise the step of generating a binary mask. In some embodiments, the step of object classification and detection is executed in parallel with the step of object segmentation.

At 1006, features can be extracted from the at least one detected and segmented object of interest. In some embodiments, the feature extraction step can be performed via a trained DNN.

Figure 11:
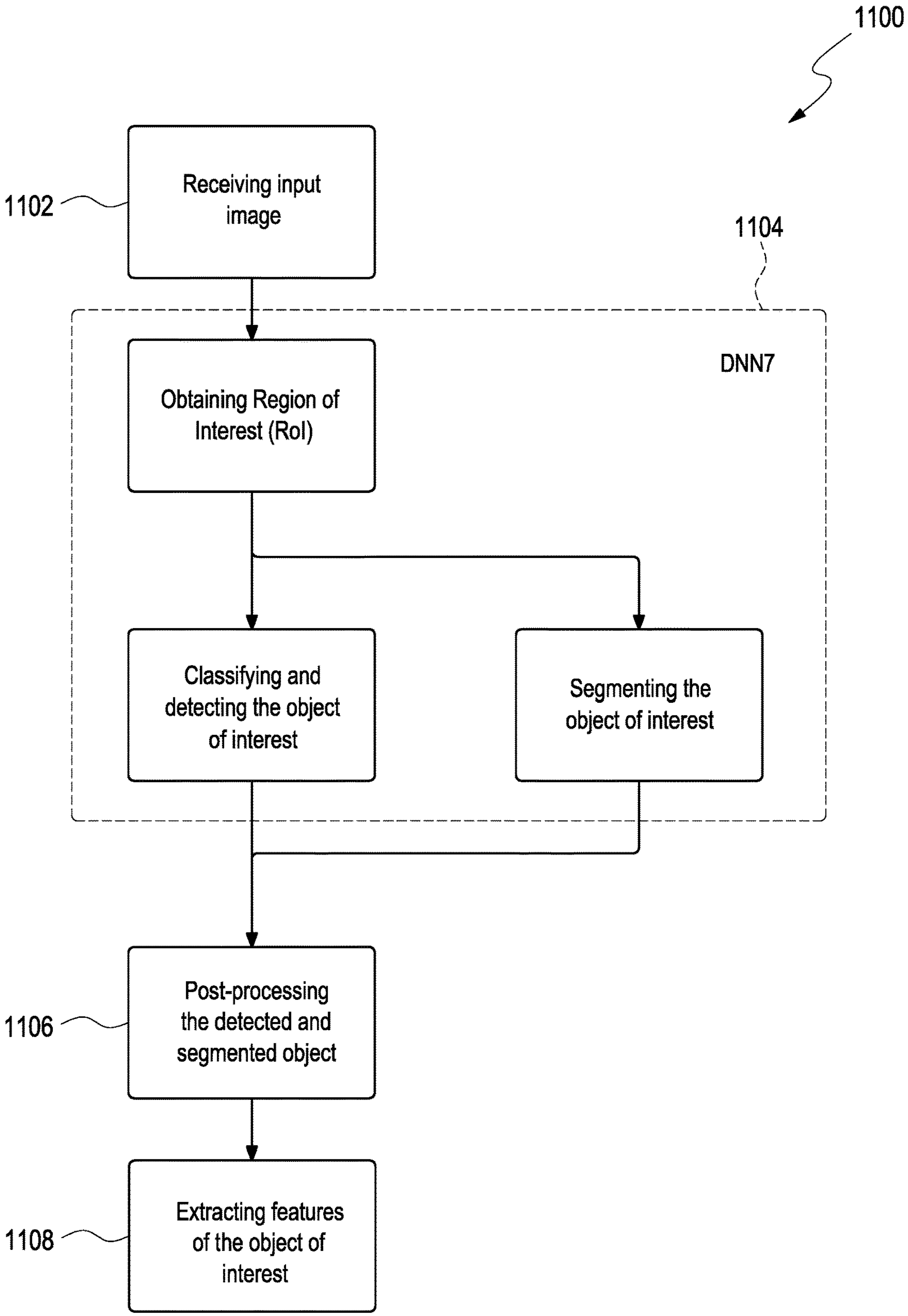
FIG. 11 depicts a flow chart that illustrates an exemplary method for object detection, segmentation and characterization in an image using for example one trained deep neural network for obtaining at least one Region of Interest (RoI), for object classification and object detection, and for object segmentation, followed by a post-processing step on the detected and segmented object.

FIG. 11 depicts a flow chart that illustrates an exemplary method for object detection, segmentation and characterization in an image using for example one trained deep neural network for obtaining at least one Region of Interest (RoI), for object classification and object detection, and for object segmentation, followed by a post-processing step on the detected and segmented object. With reference to FIG. 11, an exemplary flow chart 1100 is shown. Herein, the exemplary neural networks are named as DNNn, where n is a number employed to distinguish the several instances of neural networks within FIG. 11. It shall be noted that the numbering shall not be used to compare instances of neural networks among different figures. The operations from 1102 to 1108, or subsets therein, can be implemented on any computing system, for example the data processing apparatus 102 and/or the data-driven decision apparatus 104.

At 1102, an input image can be received. In some embodiments, the input image can be received from some database. The input image can comprise at least one object of interest.

At 1104, at least one Region of Interest (RoI) can be obtained for the at least one object of interest via a trained deep neural network DNN7 on the input image. Further, the at least one object of interest can be classified and detected in the at least one Region of Interest (RoI). The object detection can comprise the step of bounding box regression. Further, the at least one object of interest can be segmented in the at least one Region of Interest (RoI). The object segmentation can comprise the step of generating a binary mask. In some embodiments, the step of object classification and detection is executed in parallel with the step of object segmentation.

At 1106, a post-processing step on the detected and segmented objects can be performed. In an embodiment, uncertainties can be estimated relating to the segmentation performance, and thus, based on said uncertainty, objects can be rejected at this stage from future processing.

At 1108, features can be extracted from the at least one detected and segmented object of interest. In some embodiments, the feature extraction step can be performed via a trained DNN.

In the following, further particular embodiments of the present invention are listed.

1. In an embodiment, a system is disclosed comprising:

a) an input/output (I/O) unit (202) configured to receive an input image (110) that comprises at least one object of interest (112); and/or b) a processor (204), configured to perform the steps of:

(i) obtaining using a first deep neural network, DNN1 (304), from the input image at least a first Region of Interest (RoI) (304A) that includes the said at least one object of interest, and/or (ii) classifying using a second deep neural network, DNN2 (306), the at least one object of interest in the first RoI, and/or (iii) detecting using a third deep neural network, DNN3 (308), the at least one object of interest within the first RoI, and/or (iv) segmenting, using a binary mask (310A) generated by a fourth deep neural network, DNN4 (310), the at least one classified and detected object of interest, and/or (v) extracting features (312) from the said at least one classified, detected and segmented object of interest.

2. In an embodiment, a system is disclosed consisting of:

a) an input/output (I/O) unit (202) configured to receive an input image (110) that comprises at least one object of interest (112); and/or b) a processor (204), configured to perform the steps of:

(i) obtaining using a first deep neural network, DNN1 (304), from the input image at least a first Region of Interest (RoI) (304A) that includes the said at least one object of interest, and/or (ii) classifying using a second deep neural network, DNN2 (306), the at least one object of interest in the first RoI, and/or (iii) detecting using a third deep neural network, DNN3 (308), the at least one object of interest within the first RoI, and/or (iv) segmenting, using a binary mask (310A) generated by a fourth deep neural network, DNN4 (310), the at least one classified and detected object of interest, and/or (v) extracting features (312) from the said at least one classified, detected and segmented object of interest.

3. In an embodiment, a system is disclosed comprising:

a) an input/output (I/O) unit (202) configured to receive an input image (110) that consists of at least one object of interest (112); and/or b) a processor (204), configured to perform the steps of:

(i) obtaining using a first deep neural network, DNN1 (304), from the input image at least a first Region of Interest (RoI) (304A) that includes the said at least one object of interest, and/or (ii) classifying using a second deep neural network, DNN2 (306), the at least one object of interest in the first RoI, and/or (iii) detecting using a third deep neural network, DNN3 (308), the at least one object of interest within the first RoI, and/or (iv) segmenting, using a binary mask (310A) generated by a fourth deep neural network, DNN4 (310), the at least one classified and detected object of interest, and/or (v) extracting features (312) from the said at least one classified, detected and segmented object of interest.

4. In an embodiment, a system is disclosed consisting of:

a) an input/output (I/O) unit (202) configured to receive an input image (110) that consists of at least one object of interest (112); and/or b) a processor (204), configured to perform the steps of:

(i) obtaining using a first deep neural network, DNN1 (304), from the input image at least a first Region of Interest (RoI) (304A) that includes the said at least one object of interest, and/or (ii) classifying using a second deep neural network, DNN2 (306), the at least one object of interest in the first RoI, and/or (iii) detecting using a third deep neural network, DNN3 (308), the at least one object of interest within the first RoI, and/or (iv) segmenting, using a binary mask (310A) generated by a fourth deep neural network, DNN4 (310), the at least one classified and detected object of interest, and/or (v) extracting features (312) from the said at least one classified, detected and segmented object of interest.

5. A system comprising:

a) an input/output (I/O) unit (202) configured to receive an input image (110) that comprises at least one object of interest (112); and b) a processor (204), configured to perform the steps of:

(i) obtaining using a first deep neural network, DNN1 (304), from the input image at least a first Region of Interest (RoI) (304A) that includes the said at least one object of interest, and (ii) classifying using a second deep neural network, DNN2 (306), the at least one object of interest in the first RoI, and (iii) detecting using a third deep neural network, DNN3 (308), the at least one object of interest within the first RoI, and (iv) segmenting, using a binary mask (310A) generated by a fourth deep neural network, DNN4 (310), the at least one classified and detected object of interest, and (v) extracting features (312) from the said at least one classified, detected and segmented object of interest.

6. In another embodiment, the system according to any of the embodiments 1-5 is disclosed, wherein the processor (204) is configured to perform the steps (i) to (v) of embodiment 1-5 sequentially.

7. In another embodiment, the system according to any of the embodiments 1-4 is disclosed, wherein the processor (204) is configured to perform a subset of the steps (i) to (v) of embodiment 1-4 sequentially.

8. In another embodiment, the system according to any of the embodiments 1-7 is disclosed, wherein the input image comprises a plurality of isolated and/or overlapping objects of interest.

9. In another embodiment, the system according to any of the embodiments 1-4 is disclosed, wherein the input image comprises a plurality of isolated or overlapping objects of interest, and/or wherein the processor is configured to perform all the steps of the any of the embodiments 1-4 for each object of interest.

10. In another embodiment, the system according to any of the embodiments 1-9 is disclosed, wherein the input image comprises a plurality of isolated or overlapping objects of interest.

11. In another embodiment, the system according to any of the embodiments 1-10 is disclosed, wherein the input image comprises a plurality of isolated objects of interest.

12. In another embodiment, the system according to any of the embodiments 1-10 is disclosed, wherein the input image comprises a plurality of overlapping objects of interest.

13. In another embodiment, the system according to any of the embodiments 1-12 is disclosed, wherein the input image is a digital gastrointestinal histological image.

14. In another embodiment, the system according to any of the embodiments 1-13 is disclosed, wherein the input image is a digital gastrointestinal histological image, and/or the one or more objects of interest are lesions associated with a gastrointestinal disorder.

15. In another embodiment, the system according to any of the embodiments 1-14 is disclosed, wherein the input image is a digital gastrointestinal histological image, and/or the one or more objects of interest are lesions associated with a gastrointestinal disorder, and/or wherein the comparison of the extracted features of the same object in images related to different points in time allow for assessing the temporal evolution of biomarkers.

16. In another embodiment, the system according to any of the embodiments 1-15 is disclosed, wherein the input image is a digital gastrointestinal histological image.

17. In another embodiment, the system according to any of the embodiments 1-16 is disclosed, wherein the one or more objects of interest are lesions associated with a gastrointestinal disorder.

18. In another embodiment, the system according to any of the embodiments 1-17 is disclosed, wherein wherein the comparison of the extracted features of the same object in images related to different points in time allow for assessing the temporal evolution of biomarkers.

19. In another embodiment, the system according to any of the embodiments 1-18 is disclosed, wherein the processor is designed to perform the steps of classification and detection of the object of interest by means of a fifth deep neural network, DNN5 (506).

20. In another embodiment, the system according to any of the embodiments 1-19 is disclosed, wherein the processor is designed to perform the steps of classification and detection of the at least one object of interest in parallel with the step of segmentation of the at least one object of interest.

21. In another embodiment, the system according to any of the embodiments 1-20 is disclosed, wherein the processor is designed to perform the steps of classification and detection of the at least one object of interest in parallel with the step of segmentation of the at least one object of interest, whereby the steps of classification and detection are performed using one or two DNNs.

22. In another embodiment, the system according to any of the embodiments 1-20 is disclosed, wherein the processor is designed to perform the steps of classification and detection of the at least one object of interest in parallel with the step of segmentation of the at least one object of interest, whereby the steps of classification and detection are performed using one DNN.

23. In another embodiment, the system according to any of the embodiments 1-20 is disclosed, wherein the processor is designed to perform the steps of classification and detection of the at least one object of interest in parallel with the step of segmentation of the at least one object of interest, whereby the steps of classification and detection are performed using two DNNs.

24. In another embodiment, the system according to any of the embodiments 1-23 is disclosed, wherein the processor is designed to perform the steps of classification and detection of the at least one object of interest in parallel with the step of segmentation of the at least one object of interest, whereby the steps of classification and detection are performed using one or two DNNs, and/or whereby the step of segmentation is performed using a sixth deep neural network, DNN6 (608) on the Region of Interest (RoI).

25. In another embodiment, the system according to any of the embodiments 1-24 is disclosed, wherein the processor performs the steps of classification, detection and segmentation of the at least one object of interest using a seventh deep neural network, DNN7 (704) on the input image.

26. In another embodiment, the system according to any of the embodiments 1-25 is disclosed, wherein the step of extracting the object features is performed by a data-driven decision apparatus (104) communicatively coupled with the data processing apparatus (102), wherein the data processing apparatus (102) comprises the processor (204).

27. In an embodiment, a computer-implemented method is disclosed comprising the steps of:

(i) receiving an input image from a database comprising at least one object of interest, and/or (ii) obtaining using a first deep neural network, DNN1 (804), from the input image at least a first Region of Interest (RoI) that includes the said at least one object of interest, and/or (iii) classifying using a second deep neural network, DNN2 (806), the at least one object of interest in the first RoI, and/or (iv) detecting using a third deep neural network, DNN3 (808), the at least one object of interest within the first RoI, and/or (v) segmenting, using a binary mask generated by a fourth deep neural network, DNN4 (810), the at least one classified and detected object of interest, and/or (vi) extracting features (812) from the said at least one classified, detected and segmented object of interest.

28. In an embodiment, a computer-implemented method is disclosed comprising the steps of:

(i) receiving an input image from a database comprising at least one object of interest, and (ii) obtaining using a first deep neural network, DNN1 (804), from the input image at least a first Region of Interest (RoI) that includes the said at least one object of interest, and (iii) classifying using a second deep neural network, DNN2 (806), the at least one object of interest in the first RoI, and (iv) detecting using a third deep neural network, DNN3 (808), the at least one object of interest within the first RoI, and (v) segmenting, using a binary mask generated by a fourth deep neural network, DNN4 (810), the at least one classified and detected object of interest, and (vi) extracting features (812) from the said at least one classified, detected and segmented object of interest.

29. In an embodiment, a computer-implemented method is disclosed consisting of the steps of:

(i) receiving an input image from a database comprising at least one object of interest, and/or (ii) obtaining using a first deep neural network, DNN1 (804), from the input image at least a first Region of Interest (RoI) that includes the said at least one object of interest, and/or (iii) classifying using a second deep neural network, DNN2 (806), the at least one object of interest in the first RoI, and/or (iv) detecting using a third deep neural network, DNN3 (808), the at least one object of interest within the first RoI, and/or (v) segmenting, using a binary mask generated by a fourth deep neural network, DNN4 (810), the at least one classified and detected object of interest, and/or (vi) extracting features (812) from the said at least one classified, detected and segmented object of interest.

30. In an embodiment, a computer-implemented method is disclosed comprising the steps of:

(i) receiving an input image from a database consisting of at least one object of interest, and/or (ii) obtaining using a first deep neural network, DNN1 (804), from the input image at least a first Region of Interest (RoI) that includes the said at least one object of interest, and/or (iii) classifying using a second deep neural network, DNN2 (806), the at least one object of interest in the first RoI, and/or (iv) detecting using a third deep neural network, DNN3 (808), the at least one object of interest within the first RoI, and/or (v) segmenting, using a binary mask generated by a fourth deep neural network, DNN4 (810), the at least one classified and detected object of interest, and/or (vi) extracting features (812) from the said at least one classified, detected and segmented object of interest.

31. In an embodiment, a computer-implemented method is disclosed consisting of the steps of:

(i) receiving an input image from a database consisting of at least one object of interest, and/or (ii) obtaining using a first deep neural network, DNN1 (804), from the input image at least a first Region of Interest (RoI) that includes the said at least one object of interest, and/or (iii) classifying using a second deep neural network, DNN2 (806), the at least one object of interest in the first RoI, and/or (iv) detecting using a third deep neural network, DNN3 (808), the at least one object of interest within the first RoI, and/or (v) segmenting, using a binary mask generated by a fourth deep neural network, DNN4 (810), the at least one classified and detected object of interest, and/or (vi) extracting features (812) from the said at least one classified, detected and segmented object of interest.

32. In another embodiment, the method according to any of embodiments 27-31 is disclosed, wherein the steps of the embodiments 18-21 are performed sequentially.

33. In another embodiment, the method according to any of the embodiments 27-31 is disclosed, wherein a subset of the steps of the embodiments 1-4 is performed sequentially.

34. In another embodiment, the method according to any of the embodiments 27-33 is disclosed, wherein the input image comprises a plurality of isolated and/or overlapping objects of interest.

35. In another embodiment, the method according to any of the embodiments 27-34 is disclosed, wherein the input image comprises a plurality of isolated and/or overlapping objects of interest, and/or wherein the processor is configured to perform all the steps of the any of the embodiments 27-34 for each object of interest.

36. In another embodiment, the method according to any of the embodiments 27-34 is disclosed, wherein the input image comprises a plurality of isolated and overlapping objects of interest.

37. In another embodiment, the method according to any of the embodiments 27-34 is disclosed, wherein the input image comprises a plurality of isolated or overlapping objects of interest.

38. In another embodiment, the method according to any of the embodiments 27-34 is disclosed, wherein the input image comprises a plurality of isolated objects of interest.

39. In another embodiment, the method according to any of the embodiments 27-34 is disclosed, wherein the input image comprises a plurality of overlapping objects of interest.

40. In another embodiment, the method according to any of the embodiments 27-39 is disclosed, wherein the input image is a digital gastrointestinal histological image.

41. In another embodiment, the method according to any of the embodiments 27-40 is disclosed, wherein the input image is a digital gastrointestinal histological image, and/or the one or more objects of interest are lesions associated with a gastrointestinal disorder.

42. In another embodiment, the method according to any of the embodiments 27-41 is disclosed, wherein the one or more objects of interest are lesions associated with a gastrointestinal disorder.
43. In another embodiment, the method according to any of the embodiments 27-42 is disclosed, wherein the input image is a digital gastrointestinal histological image, and/or the one or more objects of interest are lesions associated with a gastrointestinal disorder, and/or wherein the comparison of the extracted features of the same object in images related to different points in time allow for assessing the temporal evolution of biomarkers.
44. In another embodiment, the method according to any of the embodiments 27-43 is disclosed, the comparison of the extracted features of the same object in images related to different points in time allow for assessing the temporal evolution of biomarkers.
45. In another embodiment, the method according to any of the embodiments 27-44 is disclosed, wherein the step of classification and detection of the at least one object of interest is performed using a fifth deep neural network, DNN5 (906).
46. In another embodiment, the method according to any of the embodiments 27-45 is disclosed, wherein the processor is designed to perform the steps of classification and detection of the at least one object of interest in parallel with the step of segmentation of the at least one object of interest, whereby the steps of classification and detection are performed using one or two DNNs.
47. In another embodiment, the method according to any of the embodiments 27-46 is disclosed, wherein the processor is designed to perform the steps of classification and detection of the at least one object of interest in parallel with the step of segmentation of the at least one object of interest, whereby the steps of classification and detection are performed using one or two DNNs, and/or whereby the step of segmentation is performed using a sixth deep neural network, DNN6 (1008) on the Region of Interest (RoI).
48. In another embodiment, the method according to any of the embodiments 27-47 is disclosed, wherein the steps of classification and detection of the at least one object of interest are performed in parallel with the step of segmentation of the at least one object of interest, whereby the steps of classification and detection are performed using one or two DNNs, and whereby the step of segmentation is performed using a sixth deep neural network, DNN6 (1008) on the Region of Interest (RoI).
49. In another embodiment, the method according to any of the embodiments 27-48 is disclosed, wherein the steps of classification and detection of the at least one object of interest are performed in parallel with the step of segmentation of the at least one object of interest, whereby the steps of classification and detection are performed using two DNNs, and whereby the step of segmentation is performed using a sixth deep neural network, DNN6 (1008) on the Region of Interest (RoI).
50. In another embodiment, the method according to any of the embodiments 27-49 is disclosed, wherein the steps of classification, detection and segmentation of the at least one object of interest are performed using a seventh deep neural network, DNN7 (1104) on the input image.
51. In another embodiment, the method according to any of the embodiments 27-50 is disclosed, wherein the steps of classification, detection and segmentation of the at least one object of interest are performed using a seventh deep neural network, DNN7 (1104) on the input image, and/or optionally wherein the deep neural network DNN7 (1104) comprises a Mask R-CNN.
52. In another embodiment, the method according to any of the embodiments 27-51 is disclosed, wherein the steps of classification, detection and segmentation of the at least one object of interest are performed using a seventh deep neural network, DNN7 (1104) on the input image, and/or optionally wherein the deep neural network DNN7 (1104) consists of a Mask R-CNN.
53. In another embodiment, the method according to any of the embodiments 27-52 is disclosed, wherein the steps of classification, detection and segmentation of the at least one object of interest are performed using a seventh deep neural network, DNN7 (1104) on the input image, and optionally wherein the deep neural network DNN7 (1104) comprises a Mask R-CNN.
54. In another embodiment, the method according to any of the embodiments 27-53 is disclosed, wherein the steps of classification, detection and segmentation of the at least one object of interest are performed using a seventh deep neural network, DNN7 (1104) on the input image, and wherein the deep neural network DNN7 (1104) comprises a Mask R-CNN.
55. In another embodiment, the method according to any of the embodiments 18-35 is disclosed, wherein a step of post-processing (1206) of the at least one detected and segmented object of interest is performed.
56. In a further embodiment, a computer program product is disclosed comprising instructions which, when the program is executed by a computer, cause the computer to carry out the steps of:

(i) receiving an input image from a database comprising at least one object of interest, and/or
(ii) obtaining using a first deep neural network, DNN1 (804), from the input image at least a first Region of Interest (RoI) that includes the said at least one object of interest, and/or
(iii) classifying using a second deep neural network, DNN2 (806), the at least one object of interest in the first RoI, and/or
(iv) detecting using a third deep neural network, DNN3 (808), the at least one object of interest within the first RoI, and/or
(v) segmenting, using a binary mask generated by a fourth deep neural network, DNN4 (810), the at least one classified and detected object of interest, and/or
(vi) extracting features (812) from the said at least one classified, detected and segmented object of interest.

57. In a further embodiment, a computer program product is disclosed consisting of instructions which, when the program is executed by a computer, cause the computer to carry out the steps of:

(i) receiving an input image from a database comprising at least one object of interest, and/or
(ii) obtaining using a first deep neural network, DNN1 (804), from the input image at least a first Region of Interest (RoI) that includes the said at least one object of interest, and/or
(iii) classifying using a second deep neural network, DNN2 (806), the at least one object of interest in the first RoI, and/or (iv) detecting using a third deep neural network, DNN3 (808), the at least one object of interest within the first RoI, and/or (v) segmenting, using a binary mask generated by a fourth deep neural network, DNN4 (810), the at least one classified and detected object of interest, and/or (vi) extracting features (812) from the said at least one classified, detected and segmented object of interest.

58. In a further embodiment, a computer program product is disclosed comprising instructions which, when the program is executed by a computer, cause the computer to carry out the steps of:

(i) receiving an input image from a database consisting of at least one object of interest, and/or (ii) obtaining using a first deep neural network, DNN1 (804), from the input image at least a first Region of Interest (RoI) that includes the said at least one object of interest, and/or (iii) classifying using a second deep neural network, DNN2 (806), the at least one object of interest in the first RoI, and/or (iv) detecting using a third deep neural network, DNN3 (808), the at least one object of interest within the first RoI, and/or (v) segmenting, using a binary mask generated by a fourth deep neural network, DNN4 (810), the at least one classified and detected object of interest, and/or (vii) extracting features (812) from the said at least one classified, detected and segmented object of interest.

59. In a further embodiment, a computer program product is disclosed consisting of instructions which, when the program is executed by a computer, cause the computer to carry out the steps of:

(i) receiving an input image from a database consisting of at least one object of interest, and/or (ii) obtaining using a first deep neural network, DNN1 (804), from the input image at least a first Region of Interest (RoI) that includes the said at least one object of interest, and/or (iii) classifying using a second deep neural network, DNN2 (806), the at least one object of interest in the first RoI, and/or (iv) detecting using a third deep neural network, DNN3 (808), the at least one object of interest within the first RoI, and/or (v) segmenting, using a binary mask generated by a fourth deep neural network, DNN4 (810), the at least one classified and detected object of interest, and/or (viii) extracting features (812) from the said at least one classified, detected and segmented object of interest.

60. In a further embodiment, a computer-readable [storage] medium/data carrier is disclosed comprising instructions which, when executed by a computer, cause the computer to carry out the steps of:

(i) receiving an input image from a database comprising at least one object of interest, and/or (ii) obtaining using a first deep neural network, DNN1 (804), from the input image at least a first Region of Interest (RoI) that includes the said at least one object of interest, and/or (iii) classifying using a second deep neural network, DNN2 (806), the at least one object of interest in the first RoI, and/or (iv) detecting using a third deep neural network, DNN3 (808), the at least one object of interest within the first RoI, and/or (v) segmenting, using a binary mask generated by a fourth deep neural network, DNN4 (810), the at least one classified and detected object of interest, and/or (ix) extracting features (812) from the said at least one classified, detected and segmented object of interest.

61. In a further embodiment, a computer-readable [storage] medium/data carrier is disclosed consisting of instructions which, when executed by a computer, cause the computer to carry out the steps of:

(i) receiving an input image from a database comprising at least one object of interest, and/or (ii) obtaining using a first deep neural network, DNN1 (804), from the input image at least a first Region of Interest (RoI) that includes the said at least one object of interest, and/or (iii) classifying using a second deep neural network, DNN2 (806), the at least one object of interest in the first RoI, and/or (iv) detecting using a third deep neural network, DNN3 (808), the at least one object of interest within the first RoI, and/or (v) segmenting, using a binary mask generated by a fourth deep neural network, DNN4 (810), the at least one classified and detected object of interest, and/or (x) extracting features (812) from the said at least one classified, detected and segmented object of interest.

62. In a further embodiment, a computer-readable [storage] medium/data carrier is disclosed comprising instructions which, when executed by a computer, cause the computer to carry out the steps of:

(vi) receiving an input image from a database consisting of at least one object of interest, and/or (vii) obtaining using a first deep neural network, DNN1 (804), from the input image at least a first Region of Interest (RoI) that includes the said at least one object of interest, and/or (viii) classifying using a second deep neural network, DNN2 (806), the at least one object of interest in the first RoI, and/or (ix) detecting using a third deep neural network, DNN3 (808), the at least one object of interest within the first RoI, and/or (x) segmenting, using a binary mask generated by a fourth deep neural network, DNN4 (810), the at least one classified and detected object of interest, and/or (xi) extracting features (812) from the said at least one classified, detected and segmented object of interest.

63. In a further embodiment, a computer-readable [storage] medium/data carrier is disclosed consisting of instructions which, when executed by a computer, cause the computer to carry out the steps of:

(xi) receiving an input image from a database consisting of at least one object of interest, and/or (xii) obtaining using a first deep neural network, DNN1 (804), from the input image at least a first Region of Interest (RoI) that includes the said at least one object of interest, and/or (xiii) classifying using a second deep neural network, DNN2 (806), the at least one object of interest in the first RoI, and/or (xiv) detecting using a third deep neural network, DNN3 (808), the at least one object of interest within the first RoI, and/or (xv) segmenting, using a binary mask generated by a fourth deep neural network, DNN4 (810), the at least one classified and detected object of interest, and/or (xii) extracting features (812) from the said at least one classified, detected and segmented object of interest.

While the present invention is described with reference to certain embodiments, it will be understood by those skilled in the art that various changes can be made and equivalents can be substituted without departure from the scope of the present invention. In addition, many modifications can be made to adapt a particular situation or material to the teachings of the present invention without departure from its scope. Therefore, it is intended that the present invention not be limited to the particular embodiments disclosed, but that the present invention will include all embodiments that fall within the scope of the appended claims.

What is claimed is:

1. A system comprising:

a) an input/output unit configured to receive an input image that comprises at least one object of interest; and b) a processor, configured to perform sequentially the steps of:

(i) obtaining using a first deep neural network from the input image at least a first Region of Interest (RoI) that includes the said at least one object of interest, and (ii) classifying using a second deep neural network, executed on the first RoI, the at least one object of interest in the first RoI by returning a class for the at least one object of interest, and (iii) detecting using a third deep neural network, executed on the at least one object of interest classified with the class, the at least one object of interest within the first RoI by returning a bounding box around the at least one object of interest classified with the class, and (iv) segmenting, using a binary mask generated by a fourth deep neural network, executed on the at least one object of interest within the bounding box, the at least one object of interest classified with the class and detected within the first RoI, and (v) extracting features from the at least one object of interest classified with the class, detected within the first RoI and segmented using the binary mask, wherein the features comprise shape, size and/or distribution of the objects.

2. The system according to claim 1, wherein the input image comprises a plurality of isolated or overlapping objects of interest.

3. The system according to claim 1, wherein the input image is a digital gastrointestinal histological image.

4. The system according to claim 1, wherein the one or more objects of interest are lesions associated with a gastrointestinal disorder.

5. The system according to claim 1, wherein the comparison of the extracted features of the same object in images related to different points in time allow for assessing the temporal evolution of biomarkers.

6. The system according to claim 1, wherein the step of extracting the object features is performed by a data-driven decision apparatus communicatively coupled with a data processing apparatus, wherein the data processing apparatus comprises the processor.

7. A computer-implemented method comprising:

(i) receiving an input image from a database comprising at least one object of interest, and (ii) obtaining using a first deep neural network from the input image at least a first Region of Interest that includes the said at least one object of interest, and (iii) classifying using a second deep neural network executed on the first RoI, the at least one object of interest in the first RoI by returning a class for the at least one object of interest, and (iv) detecting using a third deep neural network executed on the at least one object of interest classified with the class, the at least one object of interest within the first RoI, by returning a bounding box around the at least one object of interest classified with the class, and (v) segmenting, using a binary mask generated by a fourth deep neural network, executed on the at least one object of interest within the bounding box, the at least one classified and detected object of interest, and (vi) extracting features from the said at least one classified, detected and segmented object of interest using the binary mask, wherein the features comprise shape, size and/or distribution of the objects.

8. The method according to claim 7, wherein the input image comprises a plurality of isolated and/or overlapping objects of interest.

9. The method according to claim 7, wherein the input image is a digital gastrointestinal histological image.

10. The method according to claim 7, wherein the one or more objects of interest are lesions associated with a gastrointestinal disorder.

11. The method according to claim 7, wherein the comparison of the extracted features of the same object in images related to different points in time allow for assessing the temporal evolution of biomarkers.

12. The method according to claim 7, wherein the step of classification and detection of the at least one object of interest is performed using a fifth deep neural network.

13. The method according to claim 7, wherein the steps of classification, detection and segmentation of the at least one object of interest are performed using a seventh deep neural network on the input image, and wherein the seventh deep neural network comprises a Mask R-CNN.

14. The method according to claim 7, wherein a step of post-processing of the at least one detected and segmented object of interest is performed.

15. The system according to claim 1, wherein the first deep neural network comprises a Region Proposal Network.

16. The system according to claim 1, wherein the third deep neural network comprises a Fast R-CNN or a Faster R-CNN.

17. The system according to claim 1, wherein through the binary mask, each pixel in the bounding box is classified as belonging to the object of interest or the background in the bounding box.

* * * * *